US008209378B2

(12) United States Patent
Allen et al.

(10) Patent No.: US 8,209,378 B2
(45) Date of Patent: Jun. 26, 2012

(54) METHODS AND APPARATUS FOR WIDGET SHARING BETWEEN CONTENT AGGREGATION POINTS

(75) Inventors: Stewart O. Allen, Reston, VA (US);
Scott F. Cosby, Alexandria, VA (US);
Richard S. Labarca, Bellport, NY (US);
Carlos F. Reverte, Miami, FL (US)

(73) Assignee: Clearspring Technologies, Inc., McLean, VA (US)

( * ) Notice: Subject to any disclaimer, the term of this patent is extended or adjusted under 35 U.S.C. 154(b) by 168 days.

(21) Appl. No.: 12/244,606

(22) Filed: Oct. 2, 2008

(65) Prior Publication Data
US 2009/0094339 A1 Apr. 9, 2009

Related U.S. Application Data

(60) Provisional application No. 60/977,544, filed on Oct. 4, 2007, provisional application No. 61/097,094, filed on Sep. 15, 2008.

(51) Int. Cl.
G06F 15/16 (2006.01)
G06F 3/048 (2006.01)
(52) U.S. Cl. .......... 709/203; 709/201; 715/764
(58) Field of Classification Search .......... 709/201–203; 715/762–765; 717/177–178
See application file for complete search history.

(56) References Cited

U.S. PATENT DOCUMENTS

| 5,230,072 | A | 7/1993 | Smith et al. |
| 5,261,002 | A | 11/1993 | Perlman et al. |
| 5,675,510 | A | 10/1997 | Coffey et al. |
| 5,781,189 | A | 7/1998 | Holleran et al. |
| 5,796,952 | A | 8/1998 | Davis et al. |
| 5,857,102 | A | 1/1999 | McChesney et al. |
| 5,862,377 | A | 1/1999 | Lee |
| 5,892,900 | A | 4/1999 | Ginter et al. |
| 5,896,532 | A | 4/1999 | Blewett |
| 5,951,643 | A | 9/1999 | Shelton et al. |
| 6,064,980 | A | 5/2000 | Jacobi et al. |

(Continued)

FOREIGN PATENT DOCUMENTS

EP 0 996 058 A1 10/1998

(Continued)

OTHER PUBLICATIONS

Daniel Salber , Anind K. Dey , Gregory D. Abowd,"The context toolkit: aiding the development of context-enabled applications", Proceedings of the SIGCHI conference on Human factors in computing systems: the CHI is the limit, p. 434-441, May 15-20, 1999[ retrieved from the ACM database on Jun. 15, 2010].*

(Continued)

*Primary Examiner* — Philip Chea
*Assistant Examiner* — Lashanya Nash
(74) *Attorney, Agent, or Firm* — Cooley LLP

(57) ABSTRACT

In one embodiment, a method includes receiving a request from a processing device to send a widget to a handheld mobile device. The request can be defined after at least a portion of an instance of the widget has been processed at the processing device. The request can be associated with a widget identifier. The method can also include defining a widget precursor at a widget-sharing server in response to the request from the processing device. The widget precursor can be associated with the widget identifier and a placement identifier.

19 Claims, 11 Drawing Sheets

U.S. PATENT DOCUMENTS

| | | | |
|---|---|---|---|
| 6,100,890 A | 8/2000 | Bates et al. | |
| 6,108,637 A | 8/2000 | Blumenau | |
| 6,112,238 A | 8/2000 | Boyd et al. | |
| 6,125,388 A | 9/2000 | Reisman | |
| 6,233,601 B1 | 5/2001 | Walsh | |
| 6,233,684 B1 | 5/2001 | Stefik et al. | |
| 6,236,971 B1 | 5/2001 | Stefik et al. | |
| 6,266,649 B1 | 7/2001 | Linden et al. | |
| 6,269,361 B1 | 7/2001 | Davis et al. | |
| 6,311,194 B1 | 10/2001 | Sheth et al. | |
| 6,314,448 B1 | 11/2001 | Conner et al. | |
| 6,317,787 B1 | 11/2001 | Boyd et al. | |
| 6,360,261 B1 | 3/2002 | Boyd et al. | |
| 6,374,252 B1 | 4/2002 | Altoff et al. | |
| 6,466,974 B1 | 10/2002 | Nelson et al. | |
| 6,546,393 B1 | 4/2003 | Khan | |
| 6,658,568 B1 | 12/2003 | Ginter et al. | |
| 6,665,867 B1 | 12/2003 | Ims et al. | |
| 6,701,521 B1 | 3/2004 | McLlroy et al. | |
| 6,748,555 B1 | 6/2004 | Teegan et al. | |
| 6,772,180 B1 | 8/2004 | Li et al. | |
| 6,810,356 B1 | 10/2004 | Garcia-Franco et al. | |
| 6,857,124 B1 | 2/2005 | Doyle | |
| 6,970,853 B2 | 11/2005 | Schutzer | |
| 6,985,905 B2 | 1/2006 | Prompt et al. | |
| 6,985,929 B1 | 1/2006 | Wilson et al. | |
| 6,986,049 B2 | 1/2006 | Delany | |
| 7,003,522 B1 | 2/2006 | Reynar et al. | |
| 7,003,565 B2 | 2/2006 | Hind et al. | |
| 7,016,960 B2 | 3/2006 | Howard et al. | |
| 7,024,392 B2 | 4/2006 | Stefik et al. | |
| 7,031,932 B1 | 4/2006 | Lipsky et al. | |
| 7,035,943 B2 | 4/2006 | Yamane et al. | |
| 7,039,599 B2 | 5/2006 | Merriman et al. | |
| 7,046,995 B2 | 5/2006 | Rygaard | |
| 7,054,900 B1 | 5/2006 | Goldston | |
| 7,062,500 B1 | 6/2006 | Hall et al. | |
| 7,062,540 B2 | 6/2006 | Reddy et al. | |
| 7,062,561 B1 | 6/2006 | Reisman | |
| 7,072,672 B1 | 7/2006 | Vanska et al. | |
| 7,076,521 B2 | 7/2006 | Davison | |
| 7,080,159 B2 | 7/2006 | Chu et al. | |
| 7,085,682 B1 | 8/2006 | Heller et al. | |
| 7,089,237 B2 | 8/2006 | Turnbull et al. | |
| 7,099,926 B1 | 8/2006 | Ims et al. | |
| 7,100,054 B2 | 8/2006 | Wenisch et al. | |
| 7,103,912 B2 | 9/2006 | Xia et al. | |
| 7,117,250 B1 | 10/2006 | Wu | |
| 7,117,535 B1 | 10/2006 | Wecker | |
| 7,130,964 B2 | 10/2006 | Ims et al. | |
| 7,133,846 B1 | 11/2006 | Ginter et al. | |
| 7,159,116 B2 | 1/2007 | Moskowitz | |
| 7,263,551 B2 | 8/2007 | Belfiore et al. | |
| 7,346,909 B1 | 3/2008 | Eldar et al. | |
| 7,392,395 B2 | 6/2008 | Ginter et al. | |
| 7,392,483 B2 | 6/2008 | Wong et al. | |
| 7,702,675 B1 | 4/2010 | Khosla et al. | |
| 7,730,082 B2 | 6/2010 | Sah et al. | |
| 7,735,117 B2 | 6/2010 | Nadalin et al. | |
| 2002/0040314 A1 | 4/2002 | Tolson | |
| 2002/0040394 A1 | 4/2002 | Shapira | |
| 2002/0072965 A1 | 6/2002 | Merriman et al. | |
| 2002/0082914 A1 | 6/2002 | Beyda et al. | |
| 2002/0082923 A1 | 6/2002 | Merriman et al. | |
| 2002/0082997 A1 | 6/2002 | Kobata et al. | |
| 2002/0083188 A1 | 6/2002 | Hericy et al. | |
| 2002/0095336 A1 | 7/2002 | Trifon et al. | |
| 2002/0099600 A1 | 7/2002 | Merriman et al. | |
| 2002/0120673 A1 | 8/2002 | Tolson et al. | |
| 2002/0129092 A1 | 9/2002 | Tolson et al. | |
| 2002/0174200 A1 | 11/2002 | Kozina | |
| 2003/0014483 A1 | 1/2003 | Stevenson et al. | |
| 2003/0028433 A1 | 2/2003 | Merriman et al. | |
| 2003/0033403 A1 | 2/2003 | Rhodes | |
| 2003/0058277 A1 | 3/2003 | Bowman-Amuah | |
| 2003/0070061 A1 | 4/2003 | Wong et al. | |
| 2003/0105882 A1 | 6/2003 | Ali et al. | |
| 2003/0196121 A1 | 10/2003 | Raley et al. | |
| 2003/0200145 A1 | 10/2003 | Krassner et al. | |
| 2004/0073755 A1 | 4/2004 | Webb et al. | |
| 2004/0098349 A1 | 5/2004 | Tolson | |
| 2004/0107125 A1 | 6/2004 | Guheen et al. | |
| 2004/0143667 A1 | 7/2004 | Jerome | |
| 2004/0153973 A1 | 8/2004 | Horwitz | |
| 2004/0165007 A1 | 8/2004 | Shafron | |
| 2004/0172324 A1 | 9/2004 | Merriman et al. | |
| 2004/0172331 A1 | 9/2004 | Merriman et al. | |
| 2004/0172332 A1 | 9/2004 | Merriman et al. | |
| 2004/0215509 A1 | 10/2004 | Perry | |
| 2004/0215515 A1 | 10/2004 | Perry | |
| 2004/0215709 A1 | 10/2004 | Basani et al. | |
| 2004/0225562 A1 | 11/2004 | Turner | |
| 2004/0225566 A1 | 11/2004 | Beyda et al. | |
| 2004/0225668 A1 | 11/2004 | Teegan et al. | |
| 2005/0021611 A1 | 1/2005 | Knapp et al. | |
| 2005/0038702 A1 | 2/2005 | Merriman et al. | |
| 2005/0050301 A1 | 3/2005 | Whittle et al. | |
| 2005/0055458 A1 | 3/2005 | Mohan et al. | |
| 2005/0086587 A1 | 4/2005 | Balz | |
| 2005/0114774 A1 | 5/2005 | Berryman | |
| 2005/0125528 A1 | 6/2005 | Burke, II et al. | |
| 2005/0190994 A1 | 9/2005 | Yamanaka | |
| 2005/0197991 A1 | 9/2005 | Wray et al. | |
| 2005/0198105 A1 | 9/2005 | Schmitz et al. | |
| 2005/0198201 A1 | 9/2005 | Bohn et al. | |
| 2005/0210000 A1 | 9/2005 | Michard | |
| 2005/0246262 A1 | 11/2005 | Aggarwal et al. | |
| 2005/0251805 A1 | 11/2005 | Bamba et al. | |
| 2005/0256819 A1 | 11/2005 | Tibbs et al. | |
| 2005/0256954 A1 | 11/2005 | Shapira et al. | |
| 2006/0004703 A1 | 1/2006 | Spivack et al. | |
| 2006/0015406 A1 | 1/2006 | Beyda et al. | |
| 2006/0040426 A1 | 2/2006 | Antesberger et al. | |
| 2006/0088044 A1 | 4/2006 | Hammerl | |
| 2006/0089880 A1 | 4/2006 | Merriman et al. | |
| 2006/0106876 A1 | 5/2006 | MacGregor | |
| 2006/0112102 A1 | 5/2006 | Shafron | |
| 2006/0112341 A1 | 5/2006 | Shafron | |
| 2006/0129937 A1 | 6/2006 | Shafron | |
| 2006/0136843 A1 | 6/2006 | Shafron | |
| 2006/0161513 A1 | 7/2006 | Drumm et al. | |
| 2006/0178918 A1 | 8/2006 | Mikurak | |
| 2006/0190290 A1 | 8/2006 | Gomez | |
| 2006/0212589 A1 | 9/2006 | Hayer et al. | |
| 2006/0218036 A1 | 9/2006 | King et al. | |
| 2006/0242379 A1 | 10/2006 | Korgaonkar et al. | |
| 2006/0259462 A1 | 11/2006 | Timmons | |
| 2006/0277457 A1 | 12/2006 | Salkind et al. | |
| 2007/0038934 A1 | 2/2007 | Fellman | |
| 2007/0078777 A1 | 4/2007 | Demartini et al. | |
| 2007/0078953 A1 | 4/2007 | Chai et al. | |
| 2007/0101146 A1 | 5/2007 | Louch et al. | |
| 2007/0101291 A1 | 5/2007 | Forstall et al. | |
| 2007/0101297 A1 | 5/2007 | Forstall et al. | |
| 2007/0106759 A1 | 5/2007 | Willie et al. | |
| 2007/0112676 A1 | 5/2007 | Kontio et al. | |
| 2007/0130541 A1* | 6/2007 | Louch et al. | 715/804 |
| 2007/0192329 A1 | 8/2007 | Croft et al. | |
| 2007/0192339 A1 | 8/2007 | Baker et al. | |
| 2007/0209013 A1 | 9/2007 | Ramsey et al. | |
| 2007/0250618 A1 | 10/2007 | Hammond | |
| 2007/0266093 A1 | 11/2007 | Forstall et al. | |
| 2007/0288518 A1 | 12/2007 | Crigler et al. | |
| 2007/0288858 A1 | 12/2007 | Pereira et al. | |
| 2008/0010133 A1* | 1/2008 | Pyhalammi et al. | 705/14 |
| 2008/0010319 A1 | 1/2008 | Vonarburg et al. | |
| 2008/0013058 A1 | 1/2008 | Tatsuzaki | |
| 2008/0028294 A1 | 1/2008 | Sell et al. | |
| 2008/0034040 A1 | 2/2008 | Wherry et al. | |
| 2008/0034314 A1 | 2/2008 | Louch et al. | |
| 2008/0037509 A1 | 2/2008 | Foti | |
| 2008/0040426 A1 | 2/2008 | Synstelien et al. | |
| 2008/0040681 A1 | 2/2008 | Synstelien et al. | |
| 2008/0071883 A1 | 3/2008 | Alterman | |
| 2008/0082627 A1 | 4/2008 | Allen et al. | |
| 2008/0091777 A1 | 4/2008 | Carlos | |
| 2008/0097871 A1 | 4/2008 | Williams et al. | |

| | | | |
|---|---|---|---|
| 2008/0104496 A1 | 5/2008 | Williams et al. | |
| 2008/0140775 A1 | 6/2008 | Lee et al. | |
| 2008/0141141 A1 | 6/2008 | Moore et al. | |
| 2008/0141153 A1 | 6/2008 | Samson et al. | |
| 2008/0148283 A1 | 6/2008 | Allen et al. | |
| 2008/0168245 A1 | 7/2008 | De Atley et al. | |
| 2008/0168391 A1 | 7/2008 | Robbin et al. | |
| 2008/0222232 A1 | 9/2008 | Allen et al. | |
| 2008/0222295 A1 | 9/2008 | Robinson et al. | |
| 2008/0222613 A1 | 9/2008 | Allen et al. | |
| 2008/0222658 A1 | 9/2008 | Allen et al. | |
| 2008/0255962 A1 | 10/2008 | Chang et al. | |
| 2008/0319856 A1 | 12/2008 | Zito et al. | |
| 2009/0013058 A1 | 1/2009 | Chan | |
| 2009/0024943 A1 | 1/2009 | Adler et al. | |
| 2009/0070409 A1* | 3/2009 | Clayton et al. | 709/203 |
| 2009/0111448 A1 | 4/2009 | Paila | |
| 2009/0180412 A1 | 7/2009 | Albert et al. | |
| 2009/0204885 A1 | 8/2009 | Ellsworth et al. | |
| 2009/0216634 A1 | 8/2009 | Peltonen et al. | |
| 2009/0265213 A1 | 10/2009 | Hyman et al. | |
| 2009/0288004 A1 | 11/2009 | Strandell et al. | |
| 2010/0030901 A1 | 2/2010 | Hallberg et al. | |
| 2010/0100605 A1 | 4/2010 | Allen et al. | |
| 2010/0100626 A1 | 4/2010 | Allen et al. | |
| 2010/0138295 A1 | 6/2010 | Caron et al. | |

FOREIGN PATENT DOCUMENTS

| | | |
|---|---|---|
| EP | 1942422 A1 | 7/2008 |
| JP | 2005-346434 A | 12/2005 |
| WO | WO 01/86384 A2 | 11/2001 |
| WO | WO 02/21404 A1 | 3/2002 |
| WO | WO 2006/028488 A2 | 3/2006 |
| WO | WO 2008/052013 A2 | 5/2008 |
| WO | WO 2008/060828 A2 | 5/2008 |

OTHER PUBLICATIONS

Tody, D. A Portable GUI Development System—The IRAF Widget Server, Astronomicla Data Analysis Software and Systems IV; ASP Conference Series, vol. 77, 1995[retieved from the Internet "http://articles.adsabs.harvard.edu/cgi-bin/nph-iarticle_query?1995ASPC...77...89T&defaultprint=YES&filetype=.pdf" on Jun. 15, 2010].*

Luyten, K., and Coninx, K., Uiml.net: an Open Uiml Renderer for the .Net Framework, in R. Jacob, Q. Limbourg, J. Vanderdonckt (eds.), Proc. of 5th Int. Conf. of Computer-Aided Design of User Interfaces CADUI'2004. Jan. 2004. Information Systems Series, Kluwer Academics, Dordrecht, 2005, pp. 259-270. [retrived from the internet Jun. 15, 2010].*

International Search Report and Written Opinion for International Application No. PCT/US08/78744, mailed Jan. 12, 2009, 9 pages.

Office Action mailed Jan. 21, 2011 for U.S. Appl. No. 12/043,805, filed Mar. 6, 2008.

Office Action mailed Apr. 13, 2011 for U.S. Appl. No. 11/682,639, filed Mar. 6, 2007.

Office Action mailed Sep. 2, 2011 for U.S. Appl. No. 12/043,805, filed Mar. 6, 2008.

Office Action mailed Jun. 13, 2011 for U.S. Appl. No. 12/560,127, filed Sep. 15, 2009.

Office Action mailed Jun. 13, 2011 for U.S. Appl. No. 12/560,159, filed Sep. 15, 2009.

Schulte, Window Programming in Mozart, (Jan. 25, 2003) http://graubart.rz.ifi.lmu.de/programming/mozart/print/tutorial/WindowProgramming.pdf.

Ryu et al.—Widget Integration Framework for Context-Aware Middleware, MATA 2005, LNCS 3744, Springer-Verlag, 2005, pp. 161-171.

Goland et al., Simple Service Discovery Protocol, <draft-cai-ssdp-v1-03.txt>, 1999.

Amulet Technologies, Inter-Widget Communication, 2004, http://web.mit.edu/6.115/www/miscfiles/amulet/amulet-help/IWC.htm.

G. Klinker, Augmented Reality II—Context Toolkit, May 27, 2003.

Liscano & Ghavam, Context Awareness and Service Discovery for Spontaneous Networking, School of Information Technology and Engineering (SITE), University of Ottawa, Ottawa, Ontario, (2003).

Wang et al., Grid-based Collaboration in Interactive Data Language Applications. Proceedings of the International Conference on Information Technology: Coding and Computing, IEEE ()2005).

Salber et al., The Context Toolkit: Aiding the Development of Context-Enabled Applications, in Proceedings of CHI'99, Pittsburg, PA May 15-20, ACM Press, 1999.

Final Office Action mailed Feb. 16, 2011 for U.S. Appl. No. 11/537,375, filed Sep. 29, 2006.

Final Office Action mailed Jul. 8, 2010 for U.S. Appl. No. 11/682,626, filed Mar. 6, 2007.

Final Office Action mailed Nov. 5, 2010 for U.S. Appl. No. 11/774,470, filed Jul. 6, 2007.

International Search Report and Written Opinion for International Application No. PCT/US08/56073, mailed Aug. 8, 2008, 8 pages.

International Search Report and Written Opinion mailed Aug. 1, 2008 for International Application No. PCT/US08/55756, 7 pages.

International Search Report and Written Opinion mailed Jul. 25. 2008 for International Application No. PCT/US08/55755, 8 pages.

Office Action mailed Jan. 11, 2010 for U.S. Appl. No. 11/682,626, filed Mar. 6, 2007.

Office Action mailed Jul. 7, 2010 for U.S. Appl. No. 11/537,375, mailed Sep. 29, 2006.

Office Action mailed Jun. 18, 2009 for U.S. Appl. No. 11/682,626, filed Mar. 6, 2007.

Office Action mailed Jun. 24, 2010 for U.S. Appl. No. 12/043.805, filed Mar. 6, 2008.

Office Action mailed May 21, 2010 for U.S. Appl. No. 11/774,470, filed Jul. 6, 2007.

Office Action mailed Sep. 1, 2010 for U.S. Appl. No. 11/682,639, filed Mar. 6, 2007.

Supplementary European Search Report for European Patent Application No. 07843614.4, mailed Aug. 30, 2010.

Daily Flash Performance Report :: MochiBot.com Traffic Report Tour [online], [retrieved on Jan. 11, 2006]. Retrieved from the Internet: <URL: http://www.mochibot.com/tour_trafficreport.html>. (2 pgs).

Final Office Action mailed Jul. 8, 2010 for U.S. Appl. No. 11/537,362, filed Sep. 29, 2006.

Flash Traffic Analysis for a SWF :: MochiBot.com SWF Detail Tour [online], [retrieved on Jan. 11, 2006]. Retrieved from the Internet: <URL: http://www.mochibot.com/tour_swfdetail.html>. (2 pgs).

International Search Report and Written Opinion mailed Apr. 18, 2008 for International Application No. PCT/US07/80086, 9 pages.

Office Action mailed Dec. 10, 2009 for U.S. Appl. No. 11/537,362, filed Sep. 29, 2006.

Overview of the SWFs you are tracking :: MochiBot.com Dasboard Tour [online], [retrieved on Jan. 11, 2006]. Retrieved from the Internet: <URL: http://www.mochibot.com/tour_dashboard.html>. (2 pgs).

See who's hosting your SWF :: MochiBot.com Host Report Tour [online], [retrieved on Jan. 1, 2006]. Retrieved from the Internet: <URL: http://www.mochibot.com/tour_hostreport.html>. (2 pgs).

Snipperoo Web Widgets, Snipperoo Universal Widget [online], [retrieved on Jan. 11, 2006]. Retrieved from the Internet: <URL: http://www.snipperoo.com/>. (1 pg).

Widgetbox, Widgetizing the Web [online], [retrieved on Jan. 11, 2006]. Retrieved from the Internet: <URL: http://widgetbox.com>. (3 pgs).

Office Action mailed Dec. 8, 2010 for U.S. Appl. No. 12/043,805, filed Mar. 6 2008.

MochiBot, "It's 3a.m. Do you know where your Flash content is?", Flash tracking, Traffic Monitoring, and Analytics Service [online], [retrieved on Jan. 11, 2006]. Retrieved from the Internet: <URL: MochiBot.com, http://www.mochibot.com>. (4 pgs).

* cited by examiner

300

| Capability Indicator 310 | Widget Identifier (WID) 320 | User Preference 330 | Geographic Location 335 | Widget 340 | Widget Precursor 350 | Service Module 360 |
|---|---|---|---|---|---|---|
| Q | P1 | U1 | Location A | Widget X | Widget Container E | |
| R | | U2 | Location B | Widget Y | WAP Page A | Service Module A |
| S | | U3 | | | WAP Page B | |
| | | U4 | | | WAP Page C | Service Module A and B |
| T | | U5 | | Widget Z | Webpage C | Service Module A |
| Q | P2 | U1 | Location A | Widget L | Widget Container F | Service Module A |
| | | U4 | | | Widget Container G | Service Module B |
| R | | U2 | | Widget M | WAP Page A | Service Module A and C |
| S and T | | U3 | Location B | Widget N | | |

FIG. 3

METHODS AND APPARATUS FOR WIDGET SHARING BETWEEN CONTENT AGGREGATION POINTS

CROSS-REFERENCE AND RELATED APPLICATIONS

This application claims priority to the commonly owned U.S. Provisional Application Ser. No. 61/097,094, filed Sep. 15, 2008, entitled "Method and Apparatus for Management of Inter-Widget Interactions," and the commonly owned U.S. Provisional Application Ser. No. 60/977,544, filed Oct. 4, 2007, entitled "Methods and Apparatus for Widget Sharing Between Content Aggregation Points," both of which are incorporated herein by reference in their entireties.

BACKGROUND

Embodiments described herein relate generally to control of distribution of content over a network, and in particular, to methods and apparatus for widget sharing between content aggregation points.

The world wide web is a platform that has been used to exchange various forms of content including videos, text, music, etc. Often this content is distributed to users and/or computers in an ad-hoc fashion, for example, using e-mail or as files embedded in a webpage. Recently, primitive forms of "viral" distribution or replication of content have been developed that allow users to more easily spread content to other users than previously known ad-hoc methods. Although these primitive methods are more convenient than distributing content in an ad-hoc fashion, they have many shortcomings. For example, they do not provide for the ability to easily add and/or invoke services related to the content, and services, if any exist, cannot be dynamically modified and/or invoked. The spreading of content using ad-hoc methods and/or primitive forms of viral spreading may not be tracked in a desirable way. Content also may not be readily shared with users of different platforms (e.g., personal computer to mobile device). Accordingly, methods and apparatus are needed to address the shortfalls of present technology and to provide other new and innovative features related to widget sharing.

SUMMARY OF THE INVENTION

In one embodiment, a method includes receiving a request from a processing device to send a widget to a handheld mobile device. The request can be defined after at least a portion of an instance of the widget has been processed at the processing device. The request can be associated with a widget identifier. The method can also include defining a widget precursor at a widget-sharing server in response to the request from the processing device. The widget precursor can be associated with the widget identifier and a placement identifier.

BRIEF DESCRIPTION OF THE DRAWINGS

FIG. 3 illustrates a table that can be used to select a combination of a widget precursor and a widget that can both be executed at a content aggregation point of a destination network entity, according to an embodiment.

DETAILED DESCRIPTION

Figure 1:
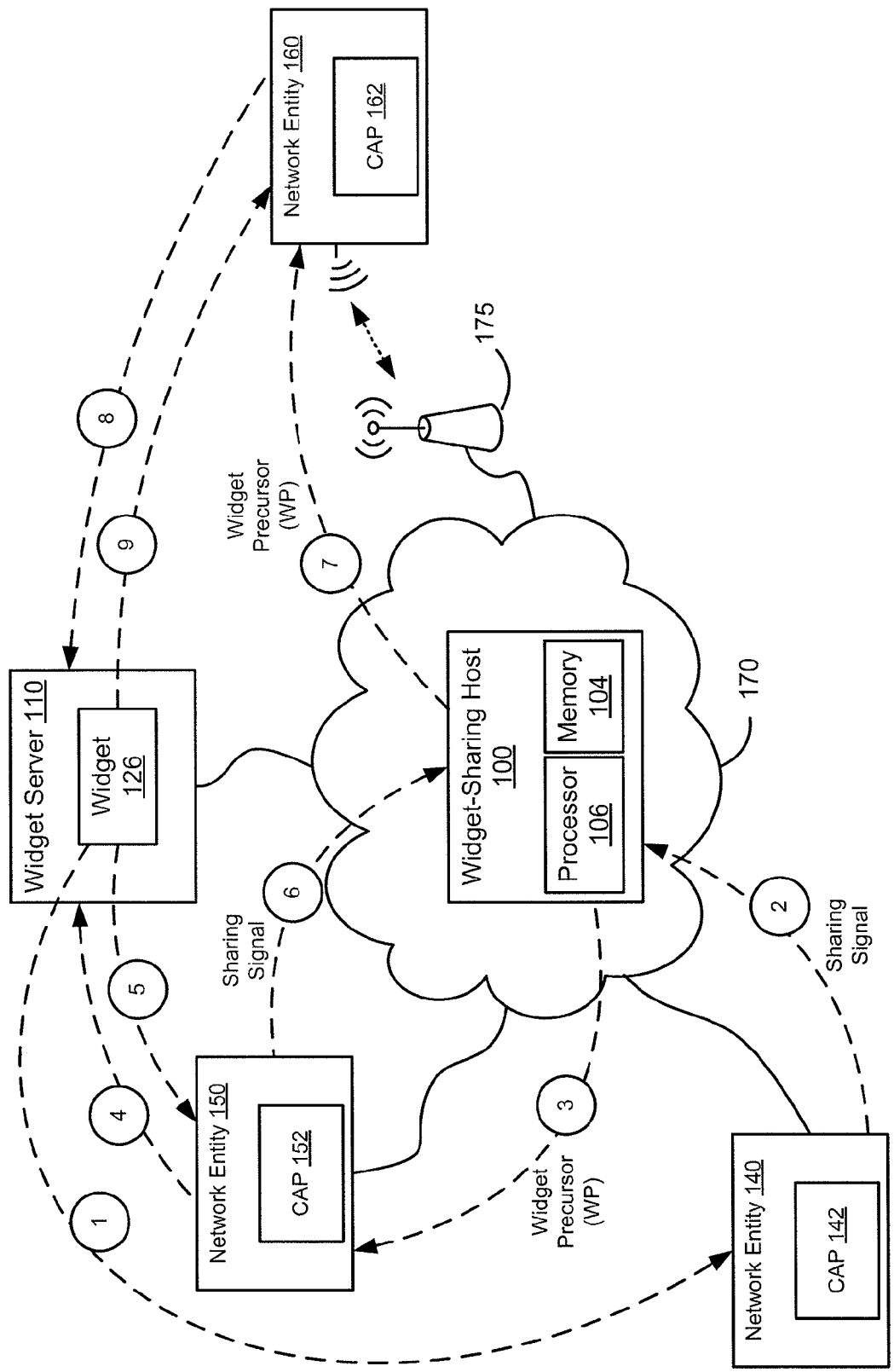
FIG. 1 is a schematic block diagram that illustrates a widget-sharing host configured to control sharing of a widget between network entities within a network, according to an embodiment.

A widget-sharing host can be configured to facilitate and/or control sharing (e.g., distribution, spreading, viral spreading, viral sharing) of a widget between one or more content aggregation points (CAPs). For example, placement of a widget at a destination content aggregation point can be triggered at a source content aggregation point executing, for example, at an entity within a network (also can be referred to as a network entity). A widget is placed at content aggregation point when the widget is associated with the content aggregation point such that the widget can be executed at the content aggregation point. For example, a widget is placed when a link to the widget is included in the content aggregation point. In some embodiments, this type of sharing can be referred to as viral sharing and the widget can be referred to as a virally spread widget.

A content aggregation point can be, for example, managed by (e.g., hosted at, served from) and/or executed at the network entity and can be, for example, a desktop, a start page, a wireless application protocol (WAP) gallery, a gallery, a webpage, a processor-readable vehicle, a portal, and/or a directory. A network entity configured to manage a content aggregation point can be referred to as a content aggregation point server. For example, WAP galleries, web galleries, and so forth are types of content aggregation points that can be referred to as content distribution points. In some embodiments, a content aggregation point can be referred to as a content aggregation location or as a content aggregation site.

The widget can be any type of object such as a static data object (e.g., a text-based object), a media object (e.g., a video, an mp3, or an image), and/or a software object (e.g., a javascript applet, a rich media object) that can be executed (e.g., displayed, manipulated) at a content aggregation point associated with, for example, a network entity. The network entity can be a wired device and/or a wireless device such as, for example, a computer (e.g., a computing device), a mobile phone, a personal digital assistant (PDA), and/or a server. The network entity can be configured with one or more platforms that can include on one or more types of hardware modules, architecture, software modules, operating systems, runtime libraries, and so forth.

A widget-sharing host can be configured to facilitate sharing of a widget that is received at a source content aggregation point with a destination content aggregation point by sending and/or receiving various signals (e.g., instructions, data, information). In some embodiments, the destination content aggregation point can be referred to as a target content aggregation point. Specifically, the widget-sharing host can be configured to receive one or more sharing signal(s) (e.g., sharing request, request) configured to trigger sharing (e.g., placement) of the widget with the destination content aggregation point. In some embodiments, the destination content aggregation point, or a destination network entity associated with the destination content aggregation point, can be referred to as a target of the sharing signal. In response to the sharing signal(s), the widget-sharing host can send one or more widget precursors (WPs) that can be used to trigger sending of an instance of the widget to a destination network entity associated with the destination content aggregation point. The sharing signal(s) can be defined at a sharing service module associated with a source network entity.

In some embodiments, the destination network entity (e.g., a mobile phone) can be configured to request an instance of the widget for execution within the destination content aggregation point based on the widget precursor(s). In some embodiments, the destination network entity can place the widget (and/or a widget-container associated with the widget) at the destination content aggregation point in response to the widget precursor(s) so that the widget can later be executed at the destination content aggregation point. In some embodiments, an instance of a widget can be referred to as a widget instance.

A sharing signal and/or a widget precursor(s) can include instructions and/or information such as a widget identifier (WID), a placement identifier (PID), and/or a reference (e.g., a pointer). The placement identifier can be, for example, a uniquely (unique within a specified space) defined identifier used to track placement of the widget. The widget identifier can be used, for example, to select a configuration of the widget that is compatible with a particular destination network entity and/or a particular destination content aggregation point.

In some embodiments, a widget can be associated with one or more services and/or can be dynamically selected when shared with (e.g., placed at) a destination content aggregation point. The widget can be dynamically selected based on a widget identifier, a capability indicator and/or a user preference (e.g., user preference defined at a source entity). The capability indicator and/or user preference can be associated with a destination network entity and/or destination content aggregation point. In some embodiments, a widget can be associated with (e.g., contained in, integrated in, referenced within) a widget container (also can be referred to as a container) when, for example, shared with (e.g., placed at) a destination content aggregation point. The widget container can be framework that can include a reference to the widget and can include a service module (e.g., tracking service module, advertisement service module, a service module served from a third party, etc.). More details related to placement of a widget container and/or a widget at a content aggregation point are set forth in co-pending application Ser. No. 11/682, 626, filed Mar. 6, 2007, entitled "Method and Apparatus for Widget and Widget-Container Platform Adaptation and Distribution," which is incorporated herein by reference in its entirety. In some embodiments, a widget can be configured to invoke various functions (e.g., service module functions) via an application programming interface (API) associated with, for example, a widget-sharing host.

In some embodiments, two or more widgets (e.g., a set of widgets) executing within one or more content aggregation points at one or more network entities can be configured to interact (e.g., communicate) with one another via a channel (e.g., a communication channel). Communication between the widgets can be referred to as inter-widget communication and can be performed via one or more signals transmitted between the widgets based on one or more protocols (e.g., Internet Protocol, a proprietary communications protocol). The signals transmitted by widgets during inter-widget communication can be referred to as inter-widget signals. In some embodiments, the inter-widget communication can be associated with an interactive session between the widgets such as a gaming session and/or a communication session (e.g., a chat session). A time period of inter-widget communication can be referred to as an inter-widget communication session.

In some embodiments, at least a portion of the communication channel can be established (and/or managed) within a network by a channel host. In some embodiments, the channel host can be a widget, a network entity (an application at the network entity), a content aggregation point, and/or a remote channel host within a network. In some embodiments, the communication channel can be established using a function served to one or more channel hosts (e.g., a widget), for example, in response to a request. In some embodiments, the communication channel can be referred to as a communication link. In some embodiments, the communication channel can operate as a bus (e.g., an ordered bus) or operate substantially similar to a bus.

One or more widgets can be served from a widget server to the content aggregation point for execution in response to a reference(s) to the widget(s) being accessed at the content aggregation point. The widget(s) can be virally spread to and/or placed at the content aggregation point(s). A widget(s) is virally spread when the widget is associated with (e.g., a reference to the widget is placed at, the widget is executed at) and/or configured to be associated with a content aggregation point in response to a sharing request associated with an instance of the widget at a different content aggregation point. More details related to viral sharing of widgets are set forth in co-pending application Ser. No. 11/537,362, filed Sep. 29, 2006, entitled "Method and Apparatus for Widget-Container Hosting and Generation," which is incorporated herein by reference in its entirety.

At least a portion of the widgets and/or at least a portion of one or more functions (e.g., service modules, widget-container functions, applications) associated with the widgets can be executed within one or more content aggregation points at one or more network entities before the inter-widget communication commences. In other words, the widgets can communicate via inter-widget signaling while executing within one or more content aggregation points at one or more network entities. In some embodiments, a widget can be configured to invoke various functions (e.g., service modules, widget-container functions) after being served to the widget and/or can invoke various functions (which can reside at a host (e.g., a widget sharing host)) via an API. In some embodiments, one or more portions of the function(s) can be referred to as a kernel.

The widgets can be configured to transmit (e.g., exchange), via inter-widget communication, information that can be used, for example, to cause an action related to a widget (e.g., modification of execution of one or more of the widgets and/or one or more service modules associated with the widgets). In some embodiments, one or more of the widgets can be configured to use inter-widget signaling to request and/or transmit (e.g., send, broadcast) an indicator related to the availability/functionality to engage in inter-widget communication.

In some embodiments, one or more portions of inter-widget communication between widgets and/or resulting behavioral changes (e.g., triggered actions) of the widget(s) can be tracked (e.g., collected, stored, processed, and/or transmitted). In other words, information related to one or more portions of inter-widget communication between widgets can be tracked. In some embodiments, a user-triggered interaction with a widget (e.g., an interaction of a user (via a user interface) with a widget) can also be tracked. The tracked inter-widget communication parameter values (e.g., inter-widget communication parameter values related to user-triggered interactions) can be, for example, processed to identify one or more trends related to the inter-widget communication and/or to cause an action (e.g., a behavioral change) related to a widget. The data that is collected, stored, and/or processed can be referred to as tracking data or as inter-widget tracking data (when specifically related to an inter-widget interaction).

During an inter-widget communication session between widgets, a single widget from the widgets can be selected to operate as (e.g., function as) a master while executing at a client rather than an application at, for example, a server operating as a master. The widget selected as the master can be referred to as a client-side master widget or as a master widget. The widget can be selected as the master based on one or more conditions. The master widget can be configured to manage one or more portions (e.g., application level signaling between member widgets) of an inter-widget communication session while a channel host can be configured to manage other portions (e.g., network level signaling related to the logistics of a communication channel) associated with the inter-widget communication session. The master widget can be configured to, for example, manage a global state of the inter-widget communication session and/or can order the exchange of content of inter-widget signals (from member widgets) within the inter-widget communication session. In some embodiments, multiple widgets can share, or individually execute, at least a portion of one or more functions of a master widget. More details related to client-side master widgets are set forth in a co-pending application No. 61/097,098, filed on Sep. 15, 2008, entitled "Methods and Apparatus Related to Inter-Widget Communication Managed by a Client-Side Master," which is incorporated herein by reference in its entirety.

In this written description and the appended claims, the singular forms "a," "an" and "the" include plural referents unless the context clearly dictates otherwise. Thus, for example, the term "an identifier" is intended to mean a single identifier or a combination of identifiers. In addition, the term "widget," which is used throughout the written description and the appended claims, can also mean an "instance of a widget." For example, a widget that is served to a content aggregation point can be an instance of the widget served to the content aggregation point.

FIG. 1 is a schematic block diagram that illustrates a widget-sharing host 100 configured to control (e.g., manage) sharing of a widget 126 between content aggregation points 142, 152, and/or 162, according to an embodiment. The content aggregation points 142, 152, and 162 are associated, respectively, with network entities 140, 150, and 160 within a network 170. The network 170 can be any type of network such as a local area network (LAN), a virtual network, and/or a wide area network (WAN) implemented as a wired network and/or a wireless network (e.g., cellular/mobile network, wi-fi, wireless LAN) in a variety of environments such as, for example, an office complex. In this embodiment, network entities 140 and 150 are wired network entities (e.g., computer, server) and network entity 160 is a wireless network entity (e.g., a mobile phone, a PDA) configured to communicate with the network 170 via wireless gateway 175.

The widget-sharing host 100 is configured to send and/or receive signals (e.g., instructions, data) to facilitate sharing of the widget 126. In this embodiment, the widget-sharing host 100 is configured facilitate sharing of widget 126 (e.g., instance of widget 126) from content aggregation point 142 of network entity 140 to content aggregation point 152 of network entity 150, and from content aggregation point 152 of network entity 150 to content aggregation point 162 of network entity 160, in that order.

Instances of the widget 126 are served to each of the content aggregation points 142, 152, and 162 from a widget server 110 separate from the widget-sharing host 100. Because sharing of the widget 126 is triggered through the widget-sharing host 100, the widget 126 (e.g., instances of the widget 126) can be shared without direct communication between the network entities 140, 150, and/or 160 (and/or content aggregation points 142, 152, and/or 162). Signals related to sharing of the widget 126 from content aggregation point 142 to content aggregation point 152, and from content aggregation point 152 to content aggregation point 162 are shown, in order, as lines 1 through 9.

As shown in FIG. 1, at least a portion of an instance of the widget 126 is sent from the widget server 110 to the network entity 140 (line 1) for execution within the content aggregation point 142. After at least a portion of an instance of the widget 126 is received and/or executed at the content aggregation point 142 of network entity 140, sharing of the widget 126 from the content aggregation point 142 to the content aggregation point 152 is triggered by a sharing signal defined at and sent from network entity 140 to the widget-sharing host 100 (line 2). The sharing signal can be defined at a sharing service module associated with network entity 140 and/or associated with widget 126.

In some embodiments, a portion of the widget 126 can be executed (e.g., displayed) at the content aggregation point 142 of network entity 140 before the sharing signal (line 2) is sent from the network entity 140. In some embodiments, a sharing signal can be sent before the widget 126 is received (e.g., after widget precursor received). In some embodiments, the sharing signal can originate at the network entity 140 (e.g., at content aggregation point 142 of network entity 140) and/or can be triggered by the network entity 140 any time before, after, or during execution of widget 126. More details related to sharing signals are described in connection with FIG. 2.

In response to the sharing signal (line 2), the widget-sharing host 100 is configured to send a widget precursor (line 3) to the content aggregation point 152 of network entity 150. In some embodiments, the content aggregation point 152 of the network entity 150 can be referred to as a target of the sharing signal. The widget precursor can include one or more references that can be accessed at network entity 150 and/or used by network entity 150 to request an instance of the widget 126 from widget server 110 (line 4). An instance of the widget 126 can be sent (e.g., served) to the content aggregation point 152 of network entity 150 from the widget server 110 (line 5) in response to the request (line 4).

In some embodiments, the widget precursor can include an instruction and/or can be a message including one or more references (e.g., a widget reference, a widget-container reference). In some embodiments, a widget precursor can include a reference to another widget precursor. In some embodiments, the widget precursor can be a widget container that includes a reference to the widget 126 or a webpage (or other type of vehicle) that includes a reference to the widget 126. The widget 126 can be "contained" in a widget container when a widget and/or service module is either referenced in the widget container or integrated into the procedural software framework of the widget container. When being contained in the widget container, the widget 126 can be referred to as being wrapped or containerized in the widget container. As a procedural software framework, the widget container can be a series of instructions that are executable or interpretable by, for example, a computer processor. In some embodiments, the widget 126 can be executed within the widget container after the widget container is received at and executed within, for example, content aggregation point 152. More details related to widget-container hosting and generation are set forth in co-pending application Ser. No. 11/537,362, which has been incorporated herein by reference in its entirety.

In some embodiments, a widget identifier, a capability indicator, and/or a user preference that can be used by the widget-sharing host 100 to define the widget precursor (line 3). In other words, the widget precursor can be dynamically defined based on the widget identifier, the capability indicator, the user preference, and/or information related to a geographic location (e.g., a geographic position of network entity 150). For example, a widget identifier and/or user preference associated with widget 126 and included in the sharing signal (line 2) can be used by the widget-sharing host 100 to define the widget precursor (line 3). The widget identifier and/or user preference associated with widget 126 can be used to define a reference and/or instruction in the widget precursor (line 3) sent to the network entity 150 so that network entity 150 can request an instance of widget 126 having a particular configuration. In some embodiments, a capability indicator and/or user preference received at the widget-sharing host 100 from network entity 150 (the destination network entity) can be used to define the widget precursor (line 3). In some embodiments, a capability indicator and/or geographic location information received at the widget-sharing host 100 from network entity 150 (the destination network entity) can be used to define the widget precursor (line 3). More details related to selection of a widget based on a widget identifier, a capability indicator, a user preference and/or geographic location are described in connection with FIGS. 2, 3 and 8.

In some embodiments, a placement identifier can be defined at the widget-sharing host 100 and associated with an instance of the widget 126 being placed at the content aggregation point 152 of network entity 150. The widget 126 is placed at the content aggregation point 152 when a reference to the widget 126 (or a reference to a widget container that contains the widget) is, for example, associated with the content aggregation point 152. In some embodiments, the placement identifier can be defined in response to the sharing signal (line 2). In some embodiments, when the instance of the widget 126 is, for example, executed within the content aggregation point 152 and/or otherwise associated with the content aggregation point 152, a placement identifier can be defined and stored at the widget-container host 100. In some embodiments, the placement identifier can be stored at the network entity 150.

The placement identifier included in the sharing signal can be used to create parentage associated with the widget 126. For example, part of the parentage of widget 126 can be defined by associating the placement identifier associated with placement of the widget 126 at the content aggregation point 142 of network entity 140 with a placement identifier of a placement of the widget 126 at the content aggregation point 152 of network entity 150. In other words, the placement identifier can be used to determine parentage of the widget 126 as it is shared between the network entities. More details related to placement identifiers and widget parentage are set forth in co-pending application Ser. No. 11/537,375, filed Sep. 29, 2006, entitled "Method and Apparatus for Widget Container/Widget Tracking and Metadata Manipulation," which is incorporated herein by reference in its entirety.

After at least a portion of an instance of the widget 126 is received at the content aggregation point 152 of network entity 150 (line 5), sharing of an instance of the widget 126 with the content aggregation point 162 of network entity 160 can be triggered at network entity 150 and performed using the same method described above. In other words, the widget 126 can be subsequently shared after at least a portion of the widget 126 has been received at the network entity 150. A sharing signal (line 6) (targeted to network entity 160 and/or the content aggregation point 162) can be defined at network entity 150 and sent to the widget-sharing host 100. In response to the sharing signal (line 6), the widget-sharing host 100 can send a widget precursor (line 7) to the content aggregation point 162 of network entity 160. The information and/or instructions included in the widget precursor (line 7) can be used to request (line 8) an instance of widget 126. In response to the request, widget server 110 can send the instance of widget 126 for execution within the content aggregation point 162 of network entity 160 (line 9).

In some embodiments, for example, the instance of the widget 126 can be served (line 9) with content and/or a service module associated with a geographic location (e.g., a geographic position) of the network entity 160. In some embodiments, for example, network entity 160 can send an indicator of a geographic location (e.g., a neighborhood, a city, a state, a global positioning coordinate) of network entity 160 to widget-sharing host 100 (which can then be communicated to widget server 110) and/or to widget server 110. In some embodiments, the indicator of the geographic location can be included in the request (line 8) for the instance of the widget 126. In some embodiments, the indicator of the geographic location can be defined based on, for example, an antenna location (e.g., a cell-phone tower location). In response, the widget server 110 can serve an instance of the widget 126 that has content (e.g., an image, an application, a functionality) associated with the geographic location and/or a service module (e.g., a service module from a third-party) associated with the geographic location. Accordingly, the instance of the widget 126 served to network entity 150 can be different than the instance of the widget 126 served to network entity 160 when network entity 150 and network entity 160 are associated with (e.g., disposed within) different geographic locations.

In some embodiments, for example, content associated with a geographic location can be an advertisement, a map, and so forth associated with the geographic location. In some embodiments, the content can be referred to as location-based content. In some embodiments, a service module associated with a geographic location can be referred to as a location-based service (LBS) modules. The location-based service modules can be, for example, a location-based game modules, a service modules configured to identify a location of a person or object, a service modules configured to collect information about a location of a network entity, a service modules configured to discover a retail outlet, a bank cash machine, and so forth.

In some embodiments, an instance of the widget 126 that has content associated with the geographic location can be served (line 9) based on the widget precursor (line 7); the widget precursor can be defined based on geographic location information. Specifically, the widget precursor (line 7) can be defined based on the geographic location information so that the instance of the widget 126 that is served to the network entity 160 (line 9) (in response to the widget precursor) will be related to the geographic location (e.g., will have a location-based content and/or a location-based service). Although not shown, in some embodiments, the geographic location information can be received at the widget-sharing host 100 from the widget server 110 after receiving the geographic location information in the request (line 8). Although not shown, in some embodiments, the geographic location information can be received at the widget-sharing host 100 in response to a direct query to the network entity 160. The query can be triggered in response to, for example, the sharing signal (line 6). In some embodiments, the network entity 160 can be configured to send (before receiving the widget 126) geographic location information to the widget-sharing host 100 and/or the widget server 110 in response to a request from the widget-sharing host 100 and/or the widget server 110.

In some embodiments, geographic location information can be received at the widget-sharing host 100 and/or the widget server 110 after the instance of the widget 126 has been served to the network entity 160 and/or at least a portion of the widget 126 has started executing at the network entity 160. In such embodiments, the instance of the widget 126 can be dynamically modified based on the geographic location. For example, the executing of the instance of the widget 126 (or an associated component (e.g., a service module, a portion of content)) can be modified and/or sent based on information related to the geographic location. In some embodiments, the network entity 160 can be configured to send geographic location information to the widget-sharing host 100 and/or the widget server 110 in response to receiving at least a portion of the widget 126, in response to execution of at least a portion of the widget 126, and/or in response to a request from the widget-sharing host 100 and/or the widget server 110.

In some embodiments, a widget container that is served as a widget precursor can contain one or more service modules. For example, a widget container that is served to, for example, network entity 150 as a widget precursor (line 3) that includes a reference to widget 126 can contain one or more service modules. In some embodiments, the service module included in the widget container can be a pre-defined function. For example, the service module can be a metadata searching/retrieval module, a polling/categorizing module, a widget container deployment module (e.g., using a placement service module), a location-based service module, a transaction service module (e.g., service module for facilitating a web purchase, service module used for signing a user up for a web service, etc.), a security module (e.g., security firewall module), and/or a widget container tracking module. The service module can also be a referral service module (e.g., a service used to refer a viewer to a widget container), an advertisement service module (e.g., a service module that includes an advertisement), or a directory service module (e.g., a service module used for searching in a directory).

After the widget 126 has been placed at (e.g., linked at) a content aggregation point, such as content aggregation point 142, the widget 126 can be executed at the content aggregation point 142 when requested. For example, in response to an instruction included in a widget precursor, such as the widget precursor shown at line 7, a reference to the widget 126 can be included in the content aggregation point 126 and configured so that the widget is requested when the reference is accessed. In some embodiments, the widget-container is a portable framework that can be referenced in (e.g., embedded in, referenced using an embed or object tag) and/or accessed from/using a content aggregation point (e.g., web-page, mobile content vehicle).

In some embodiments, a reference to widget 126 can be included in a widget container that has been placed at the content aggregation point (e.g., a reference to the widget container included at the content aggregation point). The widget container can include one or more service modules including, for example, a sharing service module that can be used to share the widget 126. In some embodiments, the widget container and widget 126 can be served from separate entities. For example, the widget container can be served from widget-sharing host 100 when requested at, for example, network entity 150, and widget 126 can be served from the widget server 110 after a reference to the widget 126 has been accessed at the widget container. In some embodiments, the content aggregation point 152, such as a webpage, can be served from yet a different entity. In some embodiments, the widget container can be dynamically served and modified based on metadata associated with the widget 126 and/or widget container.

In some embodiments, a widget 126 that is not contained in a widget container can be configured to invoke various functions associated with service modules, such as those listed above, via an API. More details related to a widget invoking a function based on an API are described in connection with FIG. 8.

In some embodiments the widget-sharing host 100 can be configured to control the sharing (e.g., distribution) of widgets based on a content rules. More details related to the control of widget sharing based on content rules are set forth in co-pending application Ser. No. 11/682,639, filed Mar. 6, 2007, entitled "Method and Apparatus for Widget and Widget-Container Distribution Control Based on Content Rules," which is incorporated herein by reference in its entirety.

In some embodiments, the widget-sharing host 100 is not in communication with, for example, network entity 150 during a time period between sending of the widget precursor (line 3) and receipt of the sharing signal (line 6). In some embodiments, during this time period only tracking data associated with the widget 126 is transmitted from the network entity 150. In some embodiments, during this time period only data related to a service module (not shown) associated with the widget 126 is transmitted from the network entity 150. In some embodiments, the functionality of the widget-sharing host 100 can be included in (e.g., distributed within) a set of widget-sharing host 100.

Figure 2:
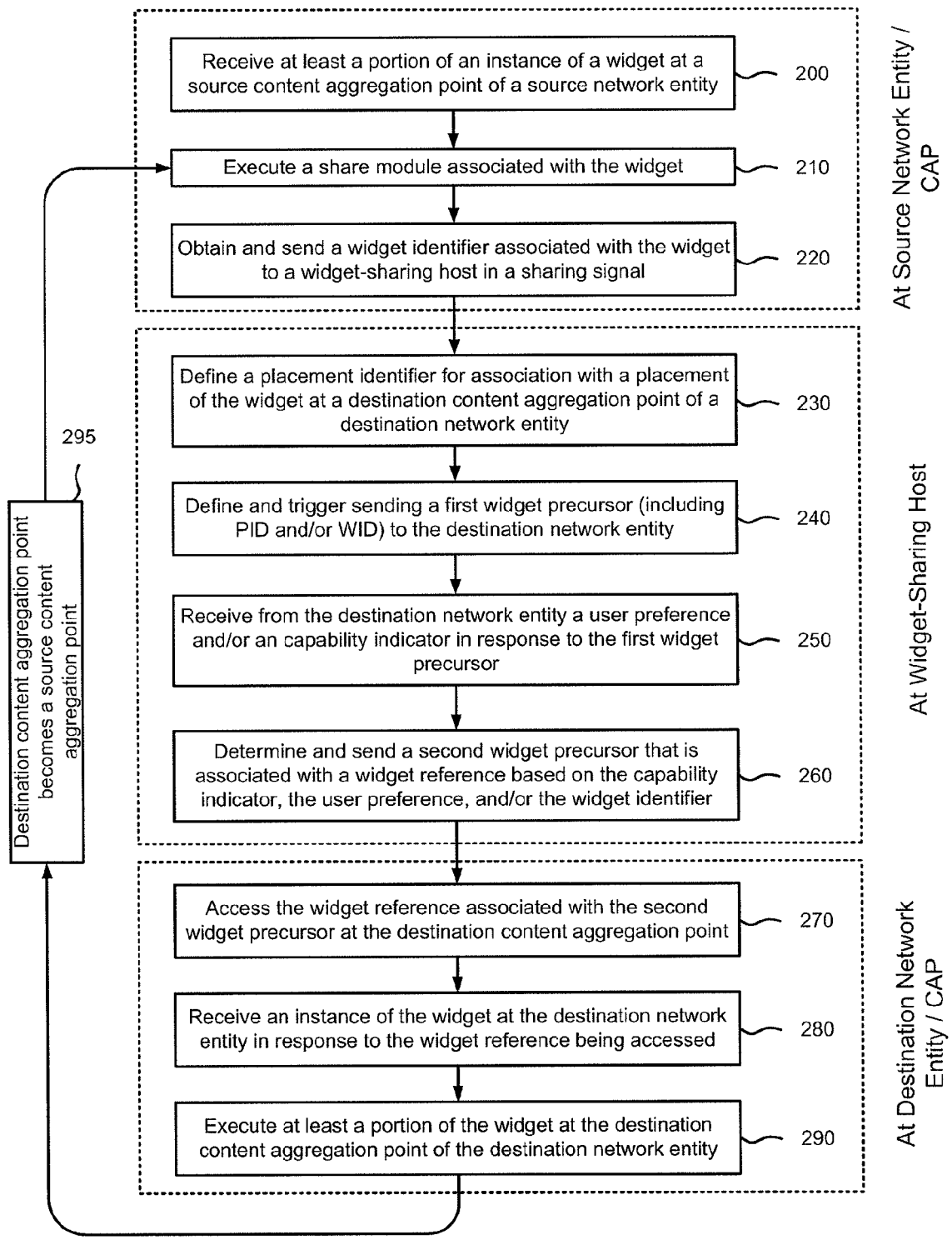
FIG. 2 is a flowchart that illustrates a method for sharing a widget between a source content aggregation point and a destination content aggregation point based on a series of widget precursors, according to an embodiment.

FIG. 2 is a flowchart that illustrates a method for sharing a widget between a source content aggregation point and a destination content aggregation point based on a series of widget precursors, according to an embodiment. Also, the flowchart illustrates a method for sending a widget precursor based on a capability indicator, a user preference, and/or a widget identifier, according to an embodiment.

As shown in FIG. 2, at least a portion of an instance of a widget is received at a source content aggregation point of a source network entity at 200. When the portion of the widget instance is received, the portion of the widget instance can be executed at the source content aggregation point. For example, in some embodiments, the portion of the widget instance can be displayed.

After at least a portion of the widget instance has been received at 200, a share module associated with the widget is executed at 210. The share module can be a share module included in a widget container containing the widget. In some embodiments, a function associated with the share module can be invoked via an API associated with the share module. In some embodiments, the share module can be included in a content aggregation point (e.g., a webpage) or a mobile content vehicle (e.g., a WAP page). A mobile content vehicle can be defined based on any protocol and/or programming language compatible with (e.g., can be processed by) a mobile device.

A widget identifier associated with the widget is obtained and sent to a widget-sharing host in a sharing signal at 220. The widget identifier can be obtained using the share module and sent to the widget-sharing host in a sharing signal defined using the share module. In some embodiments, the widget identifier can be associated with a set of widgets that includes more than one configuration (e.g., formats, protocols) of a single widget. One or more configurations of the single widget from the set of widgets can be associated with a platform of a network entity. For example, a first widget can have a configuration that is compatible with a particular platform of a mobile phone and a second widget can have a configuration that is compatible with a different platform. The first widget and the second widget can be associated with a single widget identifier because the first widget and the second widget have substantially the same content despite having different configurations.

In some embodiments, the sharing signal can be generated by a sharing module associated with the widget. In some embodiments, the sharing module can be referred to as a placement module. For example, the sharing module can be included in (e.g., integrated within) a widget container containing the widget. In some embodiments, the sharing signal can be defined based on a sharing module included in the content aggregation point or trigger via a link included in a content aggregation point.

In some embodiments, the sharing signal can include an indicator of a sharing target such as a particular content aggregation point or destination network entity. In some embodiments, the sharing target can be an address associated with a content aggregation point or an address associated with an entity such as a destination network entity. In some embodiments, the sharing target can be, for example, a telephone number associated with a mobile device, a handle associated with a user of a service, or a username. More details related to sharing mechanisms in handheld mobile devices are described in connection with FIGS. 5, 6, and 7.

A placement identifier for association with a placement of the widget at a destination content aggregation point of a destination network entity is defined at 230. The placement identifier can be defined at the widget-container host and can be, for example, a globally unique identifier. In some embodiments, the placement identifier associated with placement of the widget at the destination content aggregation point can be associated with a placement identifier of placement of the widget at the source content aggregation point to define parentage of the widget. In some embodiments, the placement identifier can be defined at, for example, a share module rather than at the widget-sharing host.

In some embodiments, the sharing signal can include other information in addition to that described above. For example, the sharing signal can include metadata associated with a widget (e.g., user preferences). The metadata can be defined at a source network entity.

A first widget precursor can be defined and sent to the destination network entity at 240. In some embodiments, the first widget precursor can be defined at and sent from the widget-sharing host. In some embodiments, a link associated with the first widget precursor can be aliased at, for example, a domain name service (DNS) server. For example, if the first widget precursor is an SMS message, a link associated with the SMS message can be aliased at, for example, a domain name service (DNS) server. In some embodiments, the widget-sharing host can be configured to trigger a separate network entity to define and send the first widget precursor to the destination network entity. In some embodiments, the proxy device can be configured to modify any portion of the SMS message (e.g., text portion, link within the SMS message).

In some embodiments, the first widget precursor can include the placement identifier and the widget identifier. If the destination network entity is a handheld mobile device, the first widget precursor can be defined based on any protocol (e.g., a protocol that has a specified format) compatible with the handheld mobile device such as a text-based message (e.g., a short message service (SMS) message). In some embodiments, the first widget precursor can include the placement identifier and the widget identifier. In some embodiments, the widget-sharing host can trigger an SMS proxy device to define and send the SMS message to the destination network entity. In some embodiments, a widget precursor sent to a handheld mobile device can be referred to as a mobile widget precursor.

A user preference and/or a capability indicator is received from the destination content aggregation point in response to the first widget precursor at 250. The capability indicator can be an indicator of a capability associated with the destination content aggregation point and/or the destination network entity. In some embodiments, the capability indicator can be an indicator of the platform of and/or resources available at the destination network entity. In some embodiments, the capability indicator can be, for example, an indicator of a capability of an application configured to process a widget and/or a widget-container associated with the widget. The application can be, for example, a web browser or a mobile content processing application (e.g., WAP browser). In some embodiments, the response can include (and/or can be defined based on) information related to geographic location, for example, of the destination network entity. In some embodiments, a user preference can be received from the source network entity, in, for example, a sharing signal.

A second widget precursor that is associated with a widget reference is determined (e.g., defined) and sent based on the capability indicator, the user preference, and/or the widget identifier at 260. For example, a widget reference to a widget that is compatible with a particular destination content aggregation point and/or destination network entity can be determined based on the capability indicator, user preference, and/or the widget identifier. In some embodiments, a link associated with the second widget precursor can be aliased at, for example, a domain name service (DNS) server. In some embodiments, a service module associated with the widget can be selected based on the capability indicator, user preference, and/or the widget identifier. More details regarding selection of a widget precursor and/or a widget based on a widget identifier and a capability indicator are discussed in connection with FIG. 3.

In some embodiments, a second widget precursor can be determined and/or sent based on geographic location information received from the destination network entity in, for example, the response to the first widget precursor. For example, if an indicator (e.g., a first widget precursor) indicates that the destination network entity is disposed in a specified geographic location (e.g., a neighborhood, a city, a state, a global positioning coordinate), the second widget precursor can be defined to trigger serving of content (e.g., content integrated within a widget, content associated with a widget-container, content associated with a service module) and/or a service module (e.g., a location-based service) related to the geographic location.

In some embodiments, the second widget precursor can be, for example, a widget container, a webpage, and/or a WAP page that includes the widget reference. In some embodiments, the second widget precursor can be a reference to a different widget precursor (e.g., a reference to a widget container that includes a link to the widget).

If the second widget precursor is, for example, a WAP page or a webpage, the widget reference can be included in the WAP page or the webpage as a link. In some embodiments, the widget reference can be configured such that the widget reference (e.g., link) can be accessed in response to a user-triggered interaction with the widget reference at the destination network entity.

If the second widget precursor is a widget container (or a reference to a widget container), the widget reference can be contained (e.g., integrated into) in the widget container or included in the widget container as a link that can be accessed in response to a use-triggered interaction at the destination network entity. In some embodiments, the link can be dynamically included in the widget container when the widget container is generated in response to a reference to the widget being accessed from a content aggregation point. In some embodiments, the widget-sharing host can trigger a determination of and/or sending of the second widget precursor. More details related to widget precursors in handheld mobile devices are described in connection with FIGS. 5, 6, and 7.

In some embodiments, the second widget precursor can be defined based on metadata (and/or an analysis of the metadata). For example, the response to the first widget precursor and/or the first widget precursor can include metadata and/or can be used to retrieve metadata associated with the destination network entity (e.g., the destination content aggregation point associated with the destination network entity). The response to the first widget precursor and/or the first widget precursor can include metadata in addition to, or in lieu of the user preference and/or the capability indicator. The metadata can be historical usage/behavioral data, past performance data, and so forth that can be used to define a second widget precursor. Specifically, for example, the metadata can be used to define the second widget precursor so that content (e.g., content associated with a widget) consistent with prior usage behavior (or predicted future usage behavior defined based on a predictive analysis (e.g., an extrapolation) of the metadata can be retrieved based on the second widget precursor. The metadata can be retrieved from, for example, a metadata database based on an identifier associated with the destination network entity.

The widget reference associated with the second widget precursor is accessed at the destination content aggregation point at 270. When the widget reference is accessed, a request for an instance of the widget can be sent to a widget server. In some embodiments, the widget reference can be configured so that the widget reference is automatically accessed at the destination content aggregation point. For example, the widget reference can be included within a portion of software associated with the second widget precursor. When the software of the second widget precursor is executed, the widget reference can be accessed. In some embodiments, if the second widget precursor is a reference to, for example, a widget container that includes the widget reference, the widget container can be requested/received first and the widget reference can subsequently be accessed from the widget container.

An instance of the widget is received at the destination network entity at 280 in response to the widget reference being accessed at 270. The instance of the widget can be sent from a widget server in response to a request received from the destination network entity. The instance of the widget can be receive at the destination content aggregation point.

At least a portion of the widget is executed at the destination content aggregation point of the destination network entity at 290. For example, in some embodiments, the widget (e.g., widget instance) can be displayed at the destination content aggregation point. The portion of the widget can be executed in response to a user-triggered interaction. In some embodiments, the widget can have content (e.g., a map, an advertisement) and/or a service module (e.g., a language preference service, a service configured to produce a current time of day based on location) related to a particular geographic location (e.g., a proximity to a landmark) associated with the destination network entity.

In some embodiments, an instance of the widget can be shared with a different content aggregation point. For example, as shown in FIG. 2, the destination content aggregation point can function as a source content aggregation point at 295 and can share the widget with another content aggregation point.

In some embodiments, only one widget precursor can be sent rather than two widget precursors, for example, if it is determined based on a sharing signal that the destination network entity is a particular type of device (e.g., determine that destination network entity is a mobile phone because sharing signal indicates destination based on a phone number), is at a particular geographic location, has a particular usage history, and so forth. In this scenario, a single widget precursor that is a mobile content vehicle that includes a reference to a widget can be sent to the destination network entity. In some embodiments, if the widget precursor is a widget (e.g., WAP page), the widget precursor can be sent without additional linking to a second widget precursor or an additional widget.

In some embodiments, the steps described in FIG. 2 can be performed in a different order and/or at different locations than specified in the figure. For example, the user preference can be received before a placement identifier is defined. For example, the widget-sharing host can trigger a separate entity to perform functions associated with the widget-sharing host.

FIG. 3 illustrates a table 300 that can be used to select a combination of a widget 340, a widget precursor 350, a service module 360, and/or a geographic location 335 that can be executed at a content aggregation point of a destination network entity, according to an embodiment. In this embodiment, a single widget 340, widget precursor 350 and/or service module 360 combination can be determined using table 300 based on a capability indicator 310, a widget identifier 320, a user preference 330, and/or geographic location 335. The capability indicators 310 can be an indicator of a capability of an application (and/or a platform) associated with a destination network entity, of a capability of a widget container, and/or a capability of a destination content aggregation point. For example, a destination network entity such as a mobile phone can have a particular operating capability (e.g., resolution, processing capability, operating system, etc.)

The user preferences 330 can be, for example, a preference related to an attribute of a widget and/or widget precursor (e.g., x, y location of the widget, size of the widget, color, themes, styles, etc.) The user preferences 330 can be received at substantially the same time as a capability indicator 310 is received. For example, in some embodiments, a user preference 330 and a capability indicator 310 can be received from a destination network entity in response to a widget precursor. In some embodiments, the user preference 330 can be from a source network entity. For example, the user preference 330 can be communicated from a source network entity to a widget-sharing host in a sharing signal.

As shown in table 300, each of the widget identifiers 320 is associated with a set of widgets 330. For example, widget identifier P1 (column 320) is associated with widgets X, Y, and Z (column 330). Each of the widgets can have a specified format (e.g., a specified protocol, a specified dimension, a specified set of components, a specified functionality) that is defined based on each of the capability indicators 310. In other words, the widgets (represented in column 340) can be configured, for example, to operate in a particular fashion on and/or can be configured to be compatible with a particular mobile device. Said differently, the widgets X, Y, and Z can be transformations of (e.g., configurations of) the same widget that are configured for operation based on specified criteria (e.g., processing capabilities).

In some embodiments, the selection of a combination of a widget 340, widget precursor 350, and/or service module 360 can be performed at a widget-sharing host in response to a sharing signal from a source network entity. For example, if capability indicator Q (column 310) and widget identifier P2 (column 320) are received at a widget-sharing host, the widget-sharing host can use table 300 to determine that widget L (column 330), widget container F (column 340), and service module A (column 360) should be sent for execution and/or placement at a destination content aggregation point (this set was selected by default because a user preference 330 value was not received at the widget-sharing host). The widget identifier P2 (column 320) can be received at the widget-sharing host from a source network entity in, for example, a sharing signal. The capability indicator Q (column 310) can be associated with the content aggregation point and can be received from an entity such as a destination network entity where the content aggregation point is being executed or a content aggregation point server (e.g., web server) hosting the content aggregation point.

In some embodiments, a default widget can be sent to a device based on capability indicator. In some embodiments, a default widget can be sent to a device based on capability indicator representing that a network entity is a particular type of device or based on geographic indicator representing that a network entity is at a particular location. For example, if a capability indicator S (shown in column 310) represents that a particular network entity requesting widget P1 (shown in column 320) is a mobile device (e.g., a PDA), widget Y can, by default, be sent to the network entity for execution. In some embodiments, widget Y can be sent to the network entity even if the particular network entity has greater capability to process, for example, a more complex widget than widget Y.

In some embodiments, a specified widget can be sent to a network entity based on processing of multiple capability indicators. For example, a network entity such as a mobile device can send a request for widget P1 (shown in column P1). Capability indicators S and T (shown in column 310) can both be associated with the request (or sent at a different time in response to, for example, a request from a widget server or widget host). As shown in table 300, because both widget Y and widget Z (shown in column 340) can be served for execution at the network entity, a condition and/or an algorithm can be used to determine which of widget Y and widget Z should be served to the network entity. In some embodiments, for example, if widget Y is a higher quality widget (based on specified criteria) than widget Z, widget Y can be served for execution. In some embodiments, by default, the lower quality widget can be served for execution.

In the example above, widget L, widget container F, and service module A were selected by default because a user preference 330 was not received at the widget-sharing host. If a user preference U4 (column 330) had been received at the widget-sharing host, the widget-sharing host could have used the additional parameter value to determine that widget L (column 330), widget container G (column 340), and service module B (column 360) should be sent for execution and/or placement at a destination content aggregation point.

In some embodiments, a widget precursor 350 can be configured with a certain type of service module 360. For example, a particular widget precursor 350 may be configured to handle only a specified set of service modules 360.

In some embodiments, after a widget 340, a widget precursor 350, and/or a service module 360 have been selected based on a capability indicator 310, a widget identifier 320, a user preference 330, and/or a geographic location 335, a reference to the widget, the widget precursor, and/or the service module can be determined. In some embodiments, table 300, or a variation thereof, can include references to the widgets 330, references to the widget precursor 350, and/or references to the service modules 360. For example, the table 300 can include a widget reference 340 column instead of the widget 340 column. In some embodiments, the reference(s) to the widget, the widget precursor, and/or the service module can be sent to a destination network entity for placement at a content aggregation point.

Figure 4:
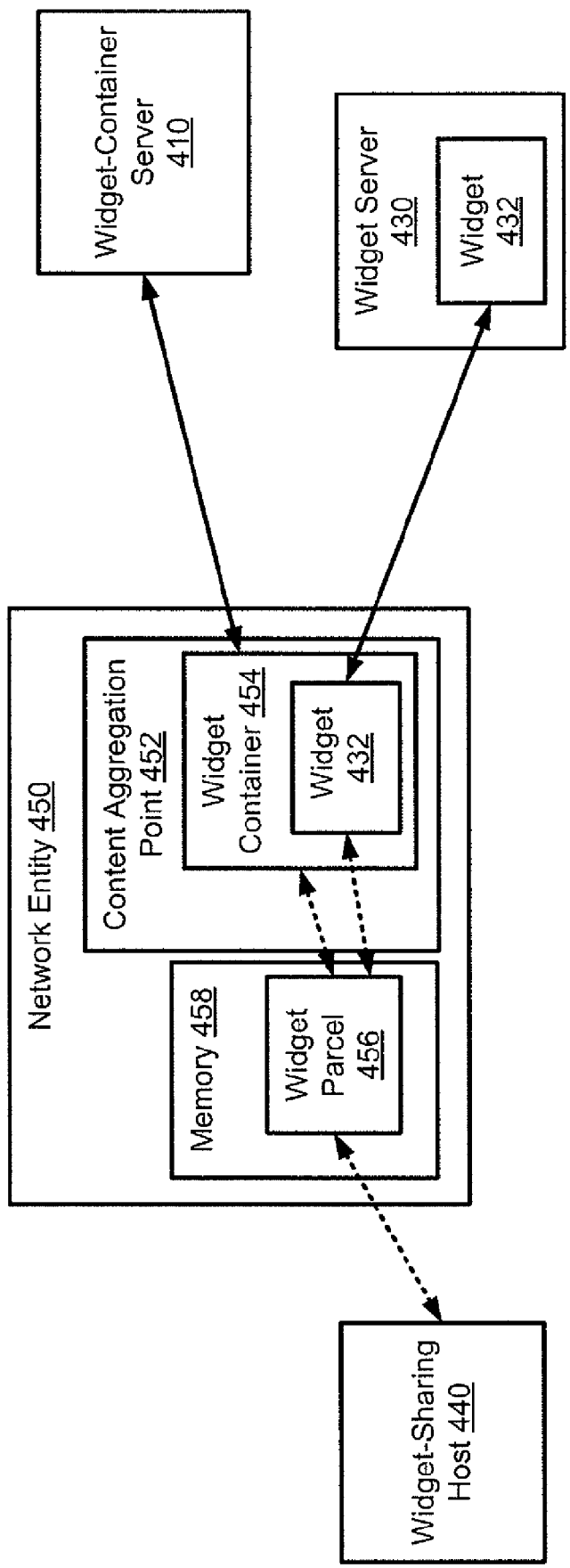
FIG. 4 is a schematic diagram that illustrates a widget parcel that can be stored in a memory at a network entity, according to an embodiment.

FIG. 4 is a schematic diagram that illustrates a widget parcel 456 that can be stored in a memory 458 at a network entity 450, according to an embodiment. The widget parcel 456 can function as a remote agent (e.g., module) that stores and/or collects information related to the widget 432 and/or a widget container 454. The network entity 450 can, in some embodiments, be a handheld mobile device.

An instance of widget 432 is configured to be served for execution within the widget container 454 from widget server 430. The widget container 454 is configured to be served from widget-container server 410 to content aggregation point 452 in response to a reference to the widget container 454 being accessed at the content aggregation point 452. In some embodiments, if the content aggregate point 452 is, for example, a webpage, the content aggregation point 452 can be served from a content aggregation point server (not shown).

The widget parcel 456 can, in some embodiments, include information related to the widget container 454 and/or widget 432 such that the widget container 454 and/or widget 432 can be executed at the content aggregation point 452 if the network entity 450 is not in communication with the widget-container server 410 and/or widget server 430. For example, the widget parcel 456 can include instructions that can be used to generate at least a portion of the widget container 454 the widget-container server 410 is unavailable.

In some embodiments, the widget parcel 456 can include or can be information related to preferences of a user so that the widget container 454 can be executed based on the preferences if the preferences cannot be retrieved from, for example, the widget-sharing host 440 where the user preferences are typically stored. For example, preferences related to the widget 432 can be stored at memory 458 as widget parcel 456 and accessed such that the widget 432 can be executed based on those preferences. In some embodiments, the widget parcel 456 can be accessed when a cached version of the widget container 454 and/or a cached version of the widget 432 is executed at the network entity 450.

In some embodiments, the widget parcel 456 can be configured to collect data related to a service module (not shown) (e.g., a tracking service module, an LBS service module). For example, if a widget-sharing host 440 that is configured to receive tracking data from a tracking service module (not shown) associated with the widget container 454 is unavailable, the tracking data can be stored as a widget parcel 456 and sent to the widget-sharing host 440 when the widget-sharing host 440 is available. In some embodiments, the widget parcel 456 can function as an agent that collects data from a service module when, for example, the widget-sharing host 440 is unavailable such that the functionality of the widget container 454 and/or widget 432 is substantially uninterrupted.

In some embodiments, the widget parcel 456 can be a remote agent that is configured to communicate with several widgets and/or widget containers that have been placed at the network entity 450. In some embodiments, the widget parcel 456 can be a module that is sent to the network entity 450 from the widget-sharing host 440. In some embodiments, the widget parcel 456 can be a module that is associated with the widget container 454 and/or widget 432 and can be installed at the network entity 450 when the widget container 454 and/or widget 432 are placed at the network entity 450. In other words, in some embodiments, the widget parcel 456 can be served to the network entity 450 in response to the widget 432 being requested. In some embodiments, the widget parcel 456 can be a widget precursor send to the network entity 450 in response to a sharing signal.

In some embodiments, the widget parcel 456 can be configured to communicate information related to, for example, a geographic location of the network entity 450. In such embodiments, the location information can be used to determine a particular type of (e.g., a particular configuration of) widget 432, service module (not shown), widget-container 454, and so forth, to serve to the network entity 450. For example, if the widget parcel 456 indicates that the network entity 450 is disposed in a specified geographic location (e.g., a neighborhood, a city, a state, a global positioning coordinate), the widget server 430 can be configured to dynamically serve an instance of the widget 432 that has a particular type of content and/or service module related to the geographic location. In some embodiments, the geographic location can be communicated to, for example, the widget server 430 and/or the widget-container server 410 so that the widget server 430 and/or the widget-container server 410 can use that information to serve content based on the geographic location.

Figure 5:
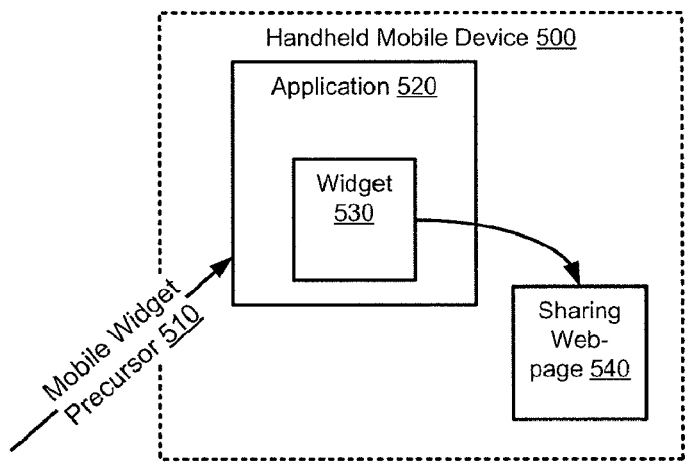
FIG. 5 is a schematic block diagram that illustrates a series of widget precursors and a sharing mechanism associated with a widget, according to an embodiment.

FIG. 5 is a schematic block diagram that illustrates a series of widget precursors and a sharing mechanism associated with a widget 530, according to an embodiment. The widget 530 is a widget that can be executed at a handheld mobile device 500. As shown in FIG. 5, a mobile widget precursor 510 can be configured to trigger downloading of an application 520 at the handheld mobile device 500. For example, the mobile widget precursor 510 can include a link to a location where the application 520 can be downloaded. The application 520 can include the widget 530 or a reference to the widget 530 such that the widget 530 can be executed when the application 520 is launched. In some embodiments, the mobile widget precursor 510 can be, for example, an SMS message that can include, for example, a widget identifier and/or a placement identifier.

The application 520 and/or widget 530 can be configured to trigger execution (e.g., display) of a sharing web-page 540 that can be used to produce a sharing signal. In some embodiments, the sharing web-page 540 can be automatically loaded at the handheld mobile device 500 after the widget 530 has completed execution. In some embodiments, the sharing web-page 540 can be displayed in a foreground of a display (not shown) of the handheld mobile device 500 while the application 520 and/or widget 530 can be in a background of the display. In some embodiments, the application 520 and/or widget 530 can be closed when the sharing web-page 540 is launched and/or received at the handheld mobile device 500. In some embodiments, the sharing web-page 540 can be a type of mobile content vehicle that can be referred to as a sharing mobile content vehicle. In some embodiments, the sharing web-page 540 can be customized. In some embodiments, a link within the widget 530 to the sharing web-page 540 can be aliased at a DNS server.

Figure 6:
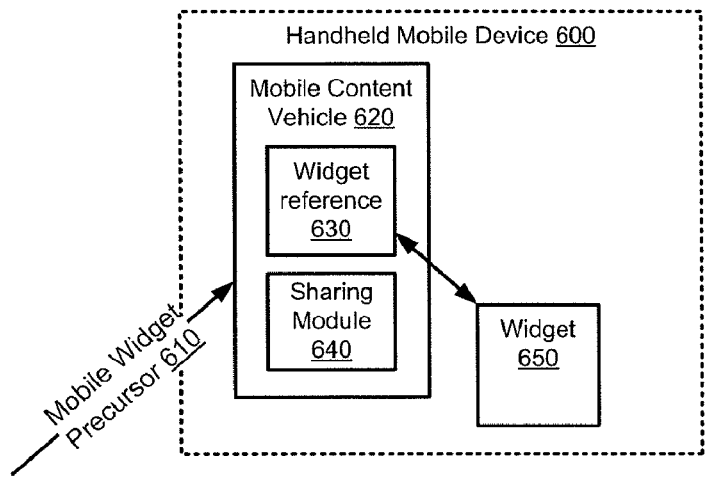
FIG. 6 is a schematic block diagram that illustrates a series of widget precursors and a sharing mechanism associated with a widget, according to an embodiment.

FIG. 6 is a schematic block diagram that illustrates a series of widget precursors and a sharing mechanism associated with a widget 650, according to an embodiment. The widget 650 is a widget that can be executed at a handheld mobile device 600. As shown in FIG. 6, a mobile widget precursor 610 can be configured to trigger downloading of a mobile content vehicle 620 at the handheld mobile device 600. The mobile content vehicle 620 can include a widget reference 630 and a sharing module 640. The widget 650 can be sent to and executed within the mobile content vehicle 620 in response to the widget reference 630 being accessed. In some embodiments, the mobile content vehicle 620 can be launched within an application (not shown) such as a browser at the handheld mobile device 600. The widget 650 can, in some embodiments, be automatically requested and subsequently executed when the mobile content vehicle 620 is executed.

The sharing module 640 can be used to produce or trigger another entity separate from, and in communication with, the handheld mobile device 600 to produce a sharing signal. In some embodiments, the sharing module 640 can be automatically loaded at the handheld mobile device 600 when the mobile content vehicle 620 is executed. In some embodiments, the sharing module 640 can be activated in response to a link being accessed at the mobile content vehicle 620.

Figure 7:
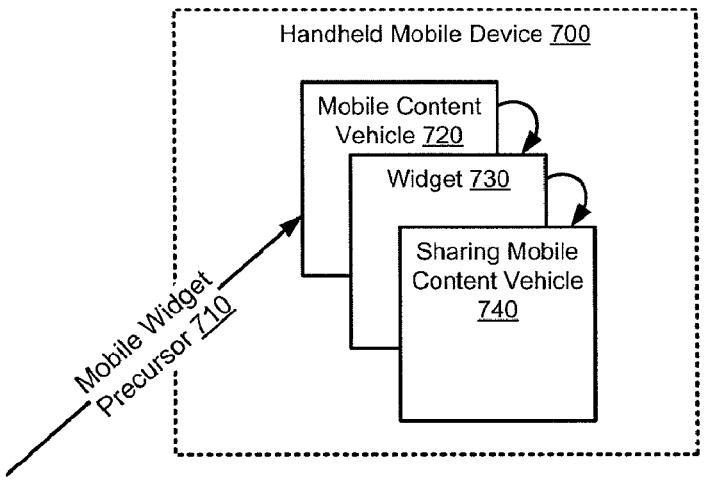
FIG. 7 is a schematic block diagram that illustrates a series of widget precursors and a sharing mechanism associated with a widget, according to an embodiment.

FIG. 7 is a schematic block diagram that illustrates a series of widget precursors and a sharing mechanism associated with a widget 730, according to an embodiment of the invention. As shown in FIG. 7, the widget 730 is a widget that can be executed at a handheld mobile device 700 after a mobile content vehicle 720 is executed, but before a sharing mobile content vehicle 740 is executed. The mobile content vehicle 720 can be requested, received, and executed in response to a mobile widget precursor 710 that includes a link (e.g., a reference) to the mobile content vehicle 720. The widget 730 can be requested, received, and executed in response to a link (e.g., a reference) in the mobile content vehicle 720 being accessed.

The sharing mobile content vehicle 740 can be used to produce a sharing signal associated with the widget 730. In some embodiments, the sharing mobile content vehicle 740 can be automatically loaded at the handheld mobile device 700 after the widget 730 has completed execution. In some embodiments, the sharing mobile content vehicle 740 can be displayed in a foreground of a display (not shown) of the handheld mobile device 700 while the mobile content vehicle 720 and/or widget 730 can be in a background of the display. In some embodiments, mobile content vehicle 720 and/or widget 730 can be closed when the sharing mobile content vehicle 740 is launched and/or received at the handheld mobile device 700.

Figure 8:
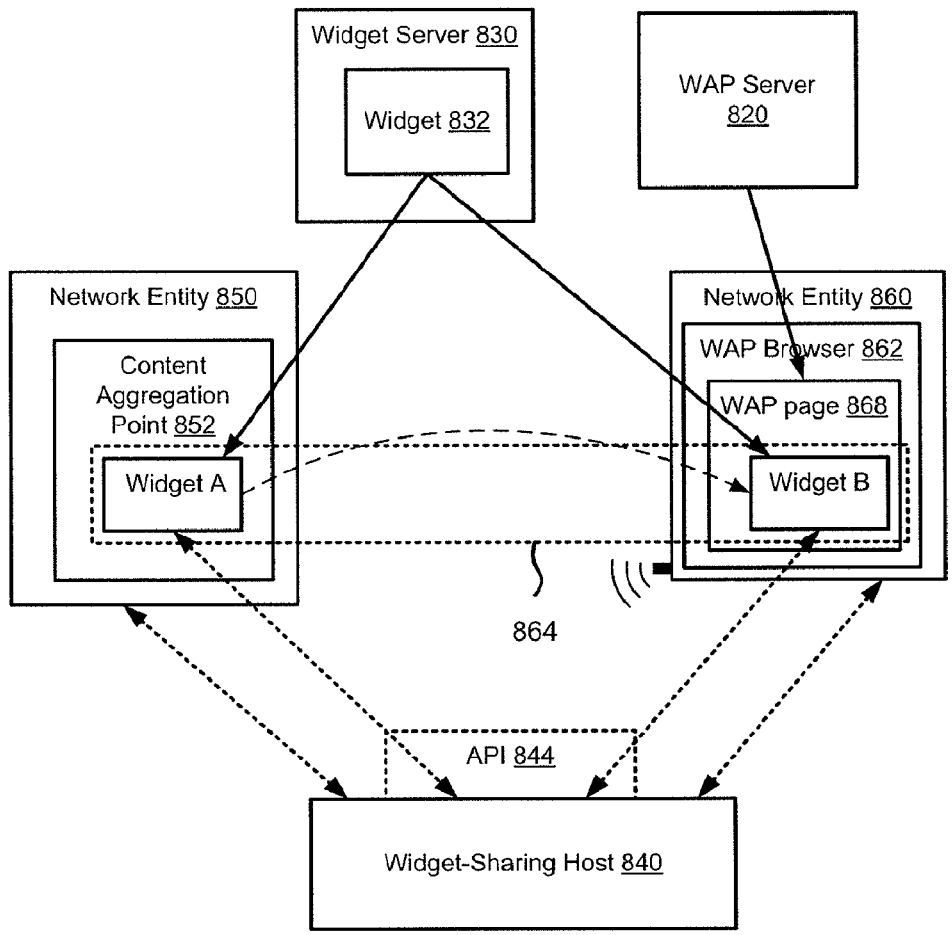
FIG. 8 is a schematic block diagram that illustrates a widget-sharing host configured to facilitate sharing of a widget between network entities, according to an embodiment.

FIG. 8 is a schematic block diagram that illustrates a widget-sharing host 840 configured to facilitate sharing of a widget 832 between network entities 812 and 814, according to an embodiment. The widget-sharing host 840 configured to send and/or receive sharing signals, widget identifiers, placement identifiers, user preferences, geographic location information, and/or widget precursors (e.g., widget precursor references) to facilitate sharing of the widget 832 between the network entities 812 and 814. As shown in FIG. 8, widget A and widget B are configured to invoke (e.g., trigger) functions associated with widget-sharing host 840 based on API 844. For example, widget A and/or widget B can invoke sharing functions at the widget-sharing host 440 based on the API 844. In this embodiment, network entity 814 is a handheld mobile device such as, for example, a mobile phone or a PDA.

Widget A and widget B are different configurations of widget 832, and thus, have substantially the same content. Widgets A and B are served from widget server 830 to the network entities 812, 814, and 816, respectively, as the widget 832 is shared. In some embodiments, widget 832 can be referred to as a master widget. Although widget A and B have different configurations, widgets A and B are from a set of widgets 864 that is associated with a single widget identifier associated with (e.g., assigned to) widget 832.

As shown in FIG. 8, widget A is served to network entity 812 for execution within content aggregation point 852 from widget-container server 810, for example, in response to a reference to widget A being accessed from content aggregation point 852. Widget B, which is shared with network entity 814 from network entity 812, is served to network entity 814 for execution within WAP page B. WAP page B is served for execution within WAP browser 818 from WAP server 820. In some embodiments, the widget A can be served for execution within a widget container (not shown) from, for example, a widget-container server (not shown).

In this embodiment, sharing of the widget 832 is triggered by an API call from widget A to the widget-sharing host 840 based on the API 844. The API call can be defined at widget A and can be a type of sharing signal. In some embodiments, the API call can be triggered in response to an interaction of the user with widget A. Because the widget A can directly trigger sharing using an API call, the widget A does not need to be associated with a widget-container that has, for example, a sharing module configured to trigger sharing of the widget 832. In response to the API call, the widget-sharing host 840 can facilitate sharing of widget 832 by, for example, sending a widget precursor to network entity 860 to trigger loading of WAP page 868 at network entity 860.

Widget A and/or widget B can be configured to invoke directly a function that can be included in a service module based on API 844 so long as widget-sharing host 840 is configured to perform that function and is an implementation of API 844. For example, widget A and/or widget B can be configured to invoke a deployment function and/or a transaction service function (functions that can be performed by a service module) through an API call (e.g., API request) to the widget-sharing host 840 based on API 844 associated with the widget-sharing host 840. Widget A and/or widget B can also be configured, for example, to invoke a tracking kernel function through an API call to the widget-sharing host 840 based on API 844. In other words, widget A can be configured to directly invoke a function that can be associated with a widget container. More details related to inter-widget communication are described below in connection with FIGS. 11 through 14.

Figure 9:
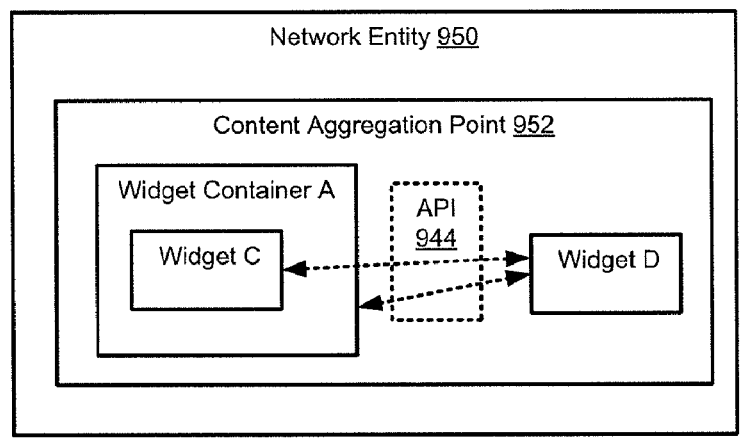
FIG. 9 is a schematic diagram that illustrates widgets at a content aggregation point of a network entity configured to communicate based on an API, according to an embodiment.

FIG. 9 is a schematic diagram that illustrates widgets at a content aggregation point 952 of a network entity 950 configured to communicate based on an API 944, according to an embodiment. In this embodiment, widget C and widget D are both implementations of API 944. For example, the widget C can be configured to access and/or invoke a function associated with widget D based on the API 944, and vice versa.

In some embodiments, widget C can be configured to access information (e.g., data, metadata, tracking data) associated with the widget D based on the API 944, and vice versa. The information can be generated at widget D (e.g., polling data, a game score). In some embodiments, widget C can be configured to share information (e.g., data, metadata, tracking data, data generated at the widget 1252) with widget D based on the API 944, and vice versa. In some embodiments, widget C can be configured to trigger widget D to perform a function based on API 944, and vice versa. For example, the widget C can be configured to trigger widget D to collect and/or send information.

As shown in FIG. 9, widget D can be configured to invoke a function associated with a widget container A based on an API 944. In some embodiments, widget C and widget D can be implementations of different APIs. Although API 944 is represented in FIG. 9 as a single API, API 944 can be a combination of multiple APIs (not shown) or a portion of a different API (not shown). In some embodiments widget C and widget D can be in separate content aggregation points (not shown). Although not shown, in some embodiments, a widget container A can be configured to communicate with and/or invoke a function associated with a separate widget container based on, for example, API 944 or a different API. The widget container A and the separate widget container can be included in (e.g., executing within) content aggregation point 952 or different content aggregation points (not shown). More details related to inter-widget communication are described below in connection with FIGS. 11 through 14.

Figure 10:
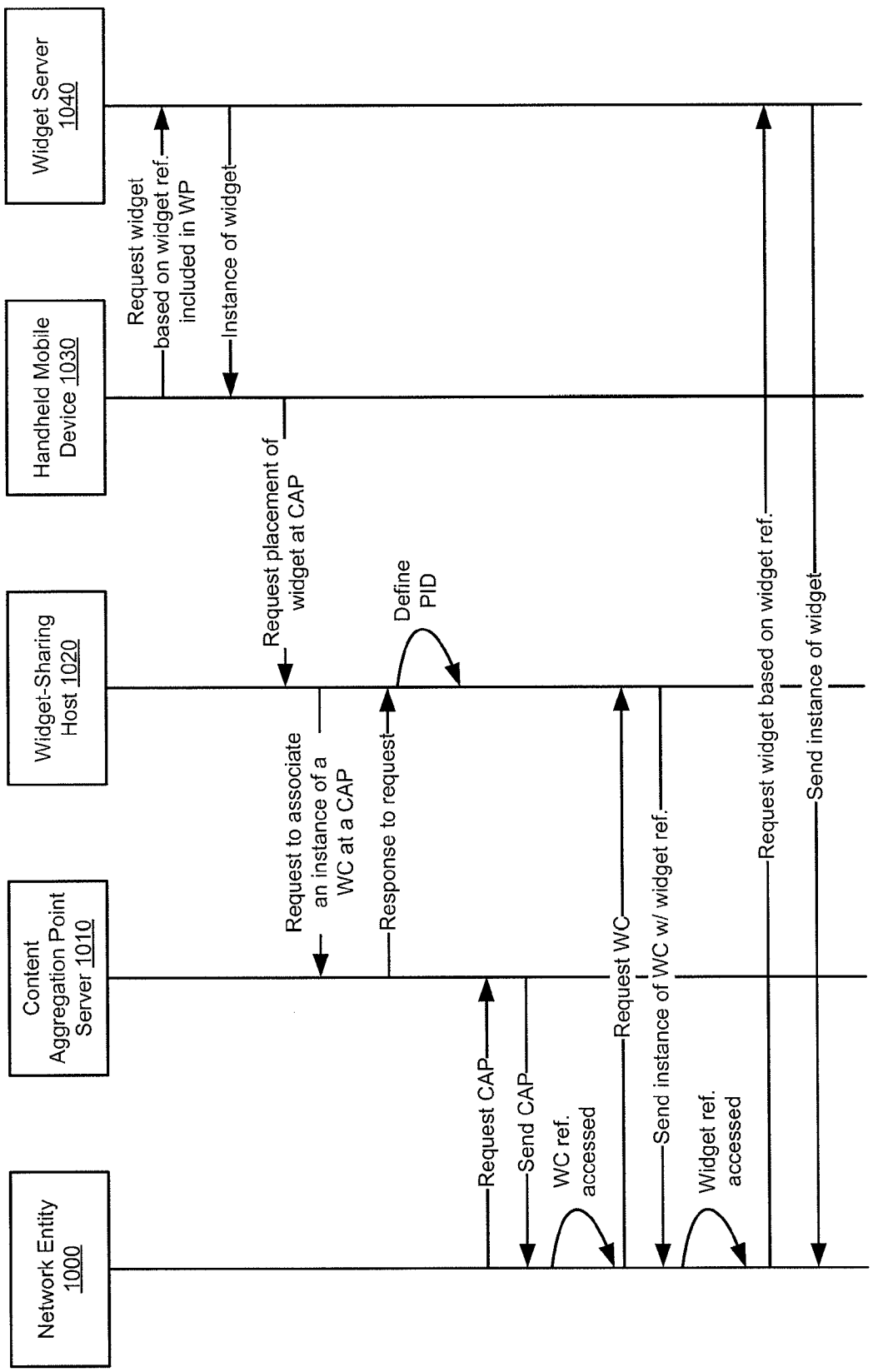
FIG. 10 is a schematic diagram that illustrates sharing of a widget from a handheld mobile device to a separate network entity, according to an embodiment.

FIG. 10 is a schematic diagram that illustrates sharing of a widget from a handheld mobile device to a separate network entity, according to an embodiment. As shown in FIG. 10, a request for a widget based on a widget reference included in a widget precursor is sent from a handheld mobile device 1030 to a widget server 1040. In response, an instance of the widget is sent to the handheld mobile device 1030.

A request for a placement of a widget at a content aggregation point is sent from the handheld mobile device 1030 to a widget-sharing host 1020. The placement request can be, for example, a sharing signal defined at a sharing module. The sharing module can be associated with a mobile content vehicle executed at the handheld mobile device 1030, for example, after the widget has executed at the handheld mobile device 1030.

A request to associated an instance of a widget container that includes a reference to the widget is sent to a content aggregation point server 1010 from the widget-sharing host 1020. The request can be based on a table stored in a memory at the widget-sharing host 1020. The request can be based on one or more parameter values associated with the content aggregation point 1010 such as rules associated with the content aggregation point. When the request is granted, a response to the request can be sent from the content aggregation point server 1010 to the widget-sharing host 1020. In some embodiments, the request can be denied. A placement identifier is defined at the widget-sharing server 1020 when the request is granted.

A request for the content aggregation point can be defined at a network entity 1000 and sent to the content aggregation point server 1010. In response, the content aggregation point server 1010 can send the content aggregation point for execution at the network entity 1000. If the widget-container reference is accessed at the content aggregation point, a request for the widget-container reference can be sent to the widget-sharing host 1020 (or a separate widget-container server (not shown)).

An instance of the widget container with a widget reference is from the widget-sharing host 1020 to the network entity 1000. When the widget reference is accessed, the widget can be requested from the widget server 1040, and an instance of the widget can be sent to the network entity 1000.

In some embodiments, a widget without a widget container can be placed at the content aggregation point and the widget without the widget container can be requested from the widget server 1040. In such an instance the widget can be configured to directly invoke services (e.g., sharing server) based on an API.

Figure 11:
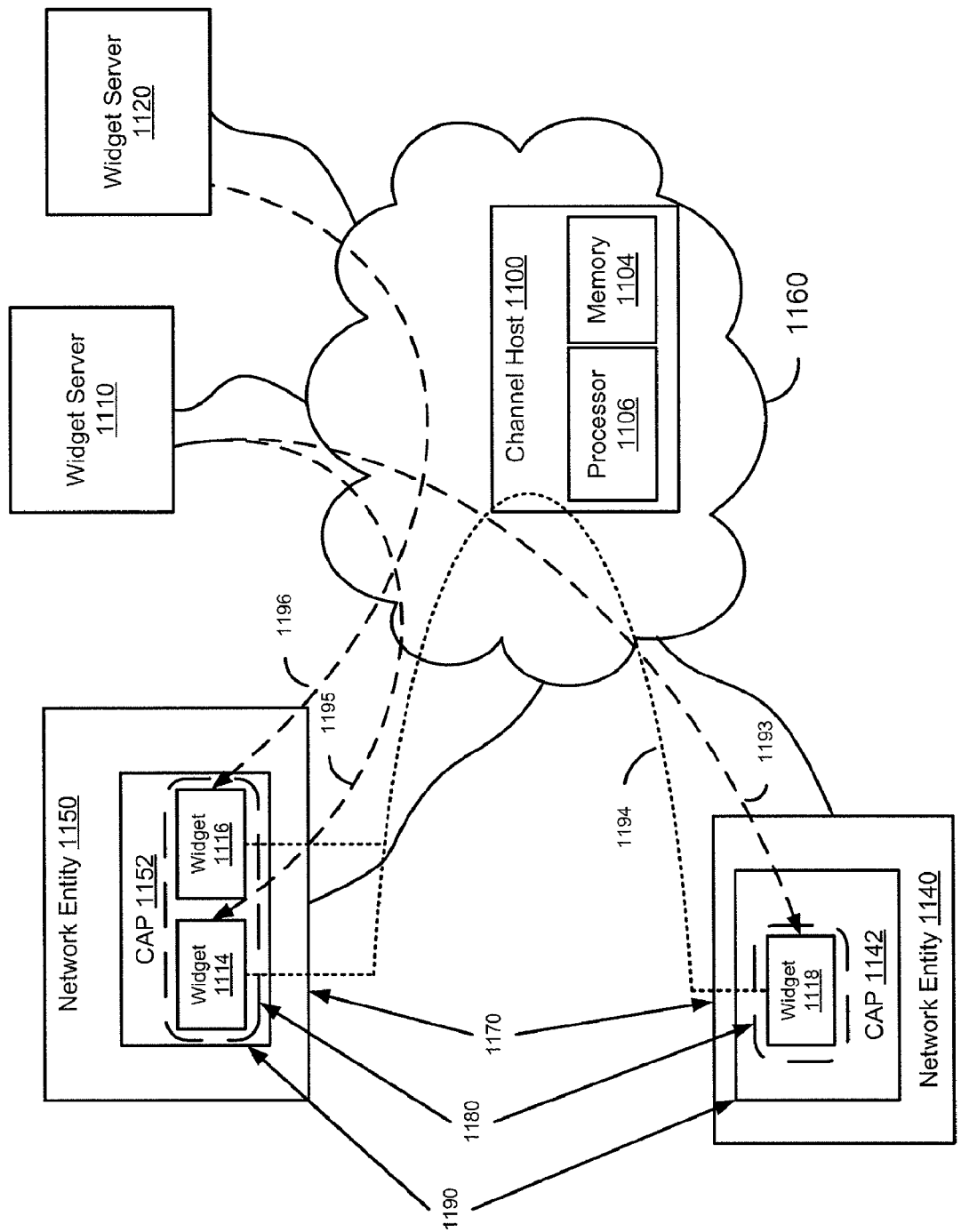
FIG. 11 is a schematic block diagram that illustrates widgets configured to communicate via a communication channel established using a channel host, according to an embodiment.

FIG. 11 is a schematic block diagram that illustrates widgets 1180 configured to communicate via a communication channel 1194 established using a channel host 1100, according to an embodiment. Specifically, the widgets 1180 (e.g., set of widgets 1180) includes widget 1114, widget 1116, and widget 1118. At least a portion of widget 1114 and widget 1116 are executing at content aggregation point 1152 at network entity 1150, and at least a portion of widget 1118 is executing at content aggregation point 1142 at network entity 1140. The network entity 1140 and/or network entity 1150 can have a memory (not shown) and/or a processor (not shown) and can be, for example, a computing device (e.g., a personal computer) and/or a wireless device (e.g., a PDA). The content aggregation point 1142 and the content aggregation point 1152 can collectively be referred to as content aggregation points 1190. The network entity 1150 and the network entity 1140 can collectively be referred to as network entities 1170.

Widget 1114 and widget 1118 are served to content aggregation point 1152 and content aggregation point 1142, respectively, from widget server 1110. Widget 1116 is served to content aggregation point 1152 from widget server 1120. Each widget from the widgets 1180 can be served in response to a request defined in response to a reference (not shown) to, for example, the widget being accessed at the content aggregation point. In some embodiments, the reference can also be referred to as a link. For example, widget 1114 can be served to network entity 1150 for execution within content aggregation point 1152 in response to a reference to widget 1114 being accessed at content aggregation point 1152. In some embodiments, reference can be automatically accessed when a portion of content aggregation point 1152 is accessed. In some embodiments, the reference can be accessed in response to, for example, a user-triggered interaction via a user-interface (not shown) associated with the network entity 1150.

The communication channel 1194 can be established within network 1160, which can include one or more wired and/or wireless segments, using channel host 1100. After the communication channel 1194 has been established, one or more of the widgets 1180 can be configured to transmit one or more signals related to inter-widget communication to another of the widgets 1180 via the communication channel 1194. In some embodiments, the communication channel 1194 can be established based on an available channel and/or a channel that has been reserved (e.g., a pre-determined channel) for use by each widget from the widgets 1180. Although not shown, in some embodiments, the channel host can be one of the widget 1180, one of the network entities 1170, one of the content aggregation points 1180, and/or a different remote channel host within the network 1160.

In some embodiments, the communication channel 1194 can be established using a channel selected by the channel host 1100. The channel host 1100 can communicate the selected channel to one or more of the widgets 1180 using, for example, a notification message. In some embodiments, the communication channel 1194 can be established in an ad-hoc fashion. For example, in response to a query (e.g., a channel request) for an available channel, the channel host 1100 can send an identifier for an available channel for communication to one or more of the widgets 1180. The query can be initiated by any of the widgets 1180 (e.g., a widget 1114).

In some embodiments, one or more users associated with a network entity (e.g., network entity 1150) can select a channel that can be used for inter-widget communication, and can communicate the selection via, for example, an out-of-band communication message (e.g., an e-mail message, a message sent via a different communication channel). The user can define one or more parameter values (e.g., a port value, a time value) for establishing the communication channel 1194.

In some embodiments, once the communication channel 1194 has been established (established in response to a request from any widget from the widgets 1180), one or more of the widgets 1180 can be invited to join the communication channel 1194. In other words, the widget(s) from the widgets 1180 can be configured to receive a request to join the communication channel 1194. In response to the invitation, one or more of the widgets 1180 can be configured to join the communication channel 1194. In some embodiments, widgets can receive and respond to invitations to join the communication channel 1194 using an out-of-band messaging mechanism (e.g., a different communication channel) and/or via the messages exchanged with the channel host 1100.

In some embodiments, the communication channel can be left open or terminated (e.g., immediately terminated, terminated after a specified period of time) after an inter-widget communication session is over. In some embodiments, an inter-widget communication session can commence when the communication channel 1194 is established and can end when the communication channel 1194 is terminated. In some embodiments, an inter-widget communication session can include a period of time when one or more of the widgets 1180 are exchanging information via the communication channel 1194.

One or more inter-widget signals can be transmitted between one or more of the widgets 1180 to communicate (e.g., send, declare, request, acknowledge) information related to the presence of and/or related to a function (e.g., a capability associated with a function, a set of parameters that can be handled by a portion of a function) associated at least one of the widgets 1180. In some embodiments, inter-widget signals can be referred to as inter-widget messages. Information related to presence can include, for example, existence of a widget, a status and/or a state of a widget, and so forth. In some embodiments, the status can be a status with respect to inter-widget communication and can be, for example, an available status, a suspended status (e.g., a paused status), a predicted available status, and/or an unavailable status. The functionality can be related to, for example, input parameter values that can be handled by (e.g., processed by) a function associated with the widget, output parameter values that can be handled by (e.g., produced by) a function associated with the widget, a specified behavior of the widget (e.g., an execution of the widget, a sequence of actions performed by the widget), and so forth. In some embodiments, one or more of the widgets 1180 can be configured to transmit (e.g., automatically transmit) and/or respond (e.g., automatically respond) to inter-widget signals related to presence and/or functionality in a widget auto-discovery process.

For example, an inter-widget signal can be sent (e.g., transmitted, broadcast) from widget 1114 to widget 1116 and/or to widget 1118 to make widget 1116 and/or widget 1118 aware of the presence of widget 1114 and/or a functionality associated with widget 1114. In other words, the widget 1114 can be configured to declare (e.g., send) information related to functionality and/or presence. In some embodiments, an inter-widget signal can be sent from widget 1114 to widget 1116 to request information related to the presence (e.g., status) of widget 1116 and/or a functionality associated with widget 1116. Inter-widget signals related to declaration of and/or request for information about presence and/or functionality can be referred to as discovery signals.

In response to a discovery signal from widget 1114, for example, widget 1116 and/or widget 1118, can send an inter-widget signal to acknowledge the information transmitted from widget 1114. In some embodiments, an inter-widget signal can be sent from one or more of the widgets 1180, for example, to acknowledge (e.g., confirm) a particular status or to block/prevent inter-widget communication. Responses to discovery signals can be referred to as a response signals. More details related to discovery of functionality related to widgets are discussed in connection with FIG. 13.

In some embodiments, an inter-widget signal can be used to, for example, communicate data such as user-triggered parameter values, input parameter values, and/or an output parameter values between the widgets 1180. These types of inter-widget signals can be referred to as data signals. In some embodiments, one or more of the widgets 1180 can be configured to send an inter-widget signal to, for example, trigger an action by another of the widgets 1180. These types of inter-widget signals can be referred to as command signals. The inter-widget signaling can be defined based on, for example, a known protocol such as Internet Protocol (IP) and/or a proprietary signaling protocol. Inter-widget signal types, in addition to those described herein, can be exchanged between the widgets 1180.

In some embodiments, at least a portion of an inter-widget communication session (e.g., inter-widget signaling, application level signaling) via the communication channel 1194 can be managed by a client-side master widget. Details related to inter-widget communication related to client-side master widgets are set forth in co-pending application Ser. No. 61/097,098, which has been incorporated herein by reference in its entirety.

In some embodiments, the widgets 1180 can be configured to exchange inter-widget signals despite being configured to operate (e.g., execute, communicate) based on different protocols, platforms, and so forth. For example, the widgets 1180 can be programmed based on different platforms that are not compatible with one another. However, the widgets 1180 can be configured to define and exchange at least inter-widget signals based on a common inter-widget signaling protocol.

In some embodiments, one of the widgets 1180 operating based on a platform can be configured to access (e.g., invoke via an API, request and receive) a translation function (not shown) that the can be used by the widget when engaging in an inter-widget communication session with another widget 1180 that is configured to operate based on a different platform. For example, widget 1118 can be configured to process (e.g., produce) inter-widget signals based on a first protocol that is incompatible with a second protocol used by widget 1116. Widget 1118 can be configured to access a translation function to translate inter-widget signals produced by widget 1118 based on the first protocol into inter-widget signals based on the second protocol so that the inter-widget signals will be compatible with widget 1116. Widget 1118 can also be configured to invoke the translation function to translate inter-widget signals produced by widget 1116 and based on the second protocol into inter-widget signals that can be compatibly processed by widget 1118.

In some embodiments, one or more widgets 1180 operating based on different platforms can be configured to negotiate a particular platform that can be used for an inter-widget interaction (e.g., during an inter-widget communication session). In some embodiments, the platform (e.g., communication protocol) can be selected by the channel host 1100. Although not shown, in some embodiments, the translation function can be configured to access, for example, a database (e.g., a local database, a remote database) with information (e.g., algorithms, look-up tables) that can be used to translate inter-widget interactions between various widget platforms.

Inter-widget signals can be transmitted before and/or after the communication channel 1194 has been established. In some embodiments, for example, after widgets 1180 have already engaged in inter-widget communication via communication channel 1194, inter-widget signals can be transmitted between the widgets 1180 so that one or more widgets from the widgets 1180 can discover and/or declare a function (or a portion of a function) associated with one or more different widgets from the widgets 1180. In some embodiments, an inter-widget signal can be sent to a specific widget (or subset of widgets) and/or can be broadcast within network 1160. Inter-widget signaling after the communication channel 1194 has been established can be transmitted using the communication channel 1194 and/or can be transmitted via an out-of-band communication link.

In some embodiments, one or more portions of an inter-widget signal can be queued for a period of time. For example, if widget 1114 is unable to respond to an inter-widget signal (e.g., an inter-widget signal defining a request related to the availability/functionality of widget 1114 to engage in inter-widget communication), the inter-widget signal can be queued and transmitted to widget 1114 when widget 1114 becomes available to respond (in response to an indicator). In some embodiments, if widget 1118 had sent the inter-widget signal to widget 1114, widget 1118 can be triggered to resend the inter-widget signal when widget 1114 is available to respond (e.g., triggered by a master of the inter-widget communication session such as a client-side master widget or the channel host 1100). In some embodiments, the inter-widget signal can be queued for a specified period of time. The inter-widget signal can be purged if widget 1114 does not become available before a specified period of time has expired. In some embodiments, the queuing of the inter-widget signal can be handled by a queuing entity. The queuing entity can be, for example, any widget (e.g., widget 1116), the channel host 1100, and/or a master of an inter-widget communication session associated with the communication channel 1194 (e.g., a master widget, the channel host 1100).

In some embodiments, one or more of the widgets 1180 can subscribe to receive information (e.g., a notification, data) related to an event related to another widget 1180. In some embodiments, the event can be an action, an update, a current event, a future event, a subset of events. In some embodiments, for example, widget 1116 can request that widget 1116 be notified when widget 1118 has acquired a particular (or type of) functionality, has calculated a particular (or type of) output parameter value, is ready to receive a particular (or type of) input parameter value, and/or is available to engage in inter-widget communication. In some embodiments, the subscription can be managed by a subscription function associated with an entity (e.g., widget 1116, widget 1118, a different widget (e.g., widget 1116), the channel host 1100, and/or a master of an inter-widget communication session associated with the communication channel 1194 (e.g., a master widget, the channel host 1100)).

One or more of the widgets 1180 can be configured to discover (via inter-widget signaling) another of the widgets 1180 (or a function associated with a widget) even though one or more of the widgets 1180 may be executing independent of one another. One or more of the widgets 1180 may operate independently when, for example, they are served to one or more content aggregation points 1190 at different times, are controlled by different entities, operate based on different platforms, are not aware of one another before being served, and/or are not specifically configured to operate together (e.g., operate in concert) as applications that are dependent on one another (except for via inter-widget communication and/or an API related to inter-widget communication). For example, even though widget 1114 and widget 1116 are both configured to execute within content aggregation point 1152, widget 1114 and widget 1116 can be independently functioning widgets that are served from different widget servers-widget server 1110 and widget server 1120, respectively.

In some embodiments, the channel host 1100 can be configured to process (e.g., store, use) information related to inter-widget communication. For example, the channel host 1100 can store a status of and/or information related to one or more functions associated with one or more widgets within network 1160. In other words, the channel host 1100 can track (e.g., actively/passively collect and store) which of the widgets 1180 have been served to the content aggregation points 1190 and can store status and/or functionality information related to the widgets 1180 for inter-widget communication. In other words, the channel host 1100 can be configured to register presence and/or functionality information related to the widgets 1180 to facilitate inter-widget communication. In some embodiments, the registered information can be made available (through access controls) to one or more of the widgets 1180. The channel host 1100 can be configured to use that information to initiate, receive, and/or respond to one or more inter-widget signals.

For example, an inter-widget signal that includes a query related to the presence of another widget can be broadcast from widget 1114 over network 1160. An individual widget such as widget 1116 can respond to the query with an indicator that widget 1116 is available for inter-widget communication, or channel host 1100 (which can be aware of the status of one or more widgets within network 1160) can respond to the inter-widget signal with an indicator that widget 1116 is available for inter-widget communication. In some embodiments, the inter-widget signal can be sent to the channel host 1100 and/or to the widgets 1180 (e.g., a subset of the widgets 1180). More details related to discovery of widgets and with respect to storage of information related to inter-widget communication are discussed in connection with FIG. 13.

As shown in FIG. 11, the channel host 1100 has a processor 1106 and a memory 1104. The processor 1106 and/or the memory 1104 can be used to perform functions related to the communication channel 1194. For example, the memory 1104 can be used to store information related to establishing the communication channel 1194 and/or information related to inter-widget signaling between the widgets 1180.

In some embodiments, one or more functions related to inter-widget communication (e.g., a function related to establishing/terminating a communication channel, a function related to inter-widget signaling) can be programmed into and/or associated with one or more of the widgets 1180. For example, the function(s) can be included as part of a widget application and/or included in a container and/or a service module associated with the widget. In some embodiments, the function(s) can be invoked via an API. More details related to containers, service modules, and APIs of widgets are described in connection with co-pending patent application Ser. No. 11/537,362, and co-pending application No. 60/997,544, both of which have been incorporated by reference herein in their entireties.

In some embodiments, one or more functions related to inter-widget communication can be served to one or more widgets 1180, one or more network entities 1170 (e.g., network entity 1150), and/or one or more of the content aggregations points 1190. In some embodiments, the function(s) can be delivered to a location (e.g., network entity 1150, content aggregation point 1152, and/or widget 1114) where the function(s) can be invoked (e.g., accessed), for example, via an API associated with the function(s). In addition, the function can be invoked by the one or more of the widgets 1180, one or more of the network entities 1170, and/or one or more of the content aggregation points 1190. For example, content aggregation point 1152 (such as a web browser) can be configured to receive and execute a function (e.g., a network level signaling function) related to sending and/or receiving messages via the communication channel 1194. In some embodiments, the function(s) can be served to, for example, content aggregation point 1152, network entity 1150, and/or widget 1114 where the function can be invoked by the content aggregation point 1152, network entity 1150, and/or widget 1114.

In some embodiments, the function(s) can be fetched (e.g., requested) by one or more widgets 1180, one or more content aggregation points 1190, and/or one or more network entities 1170 before the function(s) is needed. For example, a function related to communicating via communication channel 1194 can be fetched by widget 1114 substantially immediately before, or a specified time period before the widget 1114 attempts to transmit at least a portion of, for example, an inter-widget signal via the communication channel 1194. In some embodiments, a function(s) can be served in response to at least a portion of a widget from the widgets 1180 being executed at one or more of the content aggregation points 1190. More details related to functions being served to widgets are described in connection with FIG. 12.

In some embodiments, the functions related to inter-widget communication can reside at (e.g., be stored at, programmed into) one or more widgets 1180, one or more content aggregation points 1190, and/or one or more network entities 1170. For example, a function associated with inter-widget signaling can be included as part of an application of a widget from the widgets 1180. In some embodiments, the function can be associated with one or more of the widgets 1180 invoked via an API associated with the function.

Inter-widget communication via communication channel 1194 can be used to modify the behavior of one or more of the widgets 1180. For example, information requested from widget 1114 by widget 1116 can be sent to widget 1116 and can be used by widget 1116 to change the execution of widget 1116. The change can be determined based on one or more conditions associated with widget 1116. Specifically, widget 1116 can be configured to display a particular advertisement or execute a particular algorithm based on information related to a user-triggered interaction with widget 1114. More details related to modification of behavior of a widget based on information exchanged during an inter-widget communication session are described in connection with FIG. 13.

In some embodiments, the channel host 1100 can be configured to track one or more portions of an inter-widget communication session (e.g., an interactive inter-widget communication session) associated with the communication channel 1194. As the host of the communication channel 1194, the channel host 1100 can be configured to manage network level signaling (e.g., manage distribution/logistics of signals) associated with the communication channel 1194. Accordingly, the channel host can receive signals (e.g., inter-widget signals) transmitted via the communication channel 1194. The channel host 1100 can be configured to collect and/or store specified information related to the communication channel 1194. The information related to the communication channel 1194 can be stored as tracking data. For example, the channel host 1100 can be configured to track (e.g., collect and store) the number, content, and/or type of inter-widget signals (e.g., save signals, get signals, query signals, command signals) transmitted by one or more of the widgets 1180, user interactions with one or more of the widgets 1180, attributes (e.g., type, content, timing, and/or number) of actions of one of the widgets 1180 triggered (e.g., caused) by another of the widgets 1180, characteristics related to the communication channel 1194 (e.g., a duration of the inter-widget communication session, a date-time stamp associated with the inter-widget communication channel), and/or the types of widgets 1180 involved in the inter-widget communication session.

In some embodiments, one or more of the widgets 1180, for example, can be configured to trigger the channel host 1100 to collect and/or store specified information related to an inter-widget communication session associated with the communication channel 1194 (e.g., information related to widget 1116). For example, widget 1114 can be configured to trigger channel host 1100 to track a number of inter-widget signals (e.g., save signals/messages) transmitted between widget 1114 and widget 1116. In some embodiments, the channel host 1100 can be triggered (e.g., triggered by one of the widgets 1180) to collect and/or store information related to behavioral changes of one or more of the widgets 1180.

Although not shown, in some embodiments, a different entity such as one or more of the network entities 1170, the content aggregation points 1190, and/or the widgets 1180 can be configured to collect and/or store information related to an inter-widget communication session associated with the communication channel 1194. For example, widget 1114 can be configured to collect and/or store information related to content sent from widget 1114 and/or received from widget 1118. In some embodiments, content aggregation point 1152 can be configured to collect and/or store information related to execution of widget 1114 and/or widget 1116. In some embodiments, network entity 1140 can be configured to collect and/or store information related to inter-widget signaling associated with widget 1118.

In some embodiments, information related to an inter-widget communication session that is collected and/or stored by the network entities 1170, the content aggregation points 1190, and/or the widgets 1180 can be sent to a different entity for storage and/or further processing. In some embodiments, the information can be transmitted using, for example, one or more packets (e.g., packet bursts, regularly scheduled packets). The information can be sent to, for example, the channel host 1100, a widget server (e.g., widget server 1110), and/or a different computing entity (not shown) for storage and/or further processing. In some embodiments, the information can be transmitted via the communication channel 1194. In some embodiments, the information related to an inter-widget communication session (e.g., tracked data) can be processed using the apparatus and methods set forth in co-pending application Ser. No. 61/089,357, entitled, "Methods and Apparatus for Processing Data to Produce a Data Tree," which is incorporated by reference herein in its entirety.

In some embodiments, information that is tracked during (or after) an inter-widget communication session can be used to modify the behavior of one or more of the widgets 1180. For example, information related to messages transmitted between widget 1116 and widget 1118 can be used to modify the behavior of widget 1114. For example, widget 1114 can execute in a different fashion based on an inter-widget signaling trend between widget 1116 and widget 1118. Specifically, widget 1114 can be configured to display a particular advertisement/content or execute a particular algorithm based on the content of inter-widget signals transmitted between widget 1116 and widget 1118 during a current or terminated inter-widget communication session.

Although FIG. 11 is related to inter-widget communication via communication channel 1194, which is a communication channel established using channel host 1100, the embodiments described in connection with FIG. 11 can be applied in connection with a different communication channel configuration. For example, the embodiments described in connection with FIG. 11 can be applied within a communication channel established exclusively at a network entity (e.g., a communication channel established using a function associated with a content aggregation point).

Figure 12:
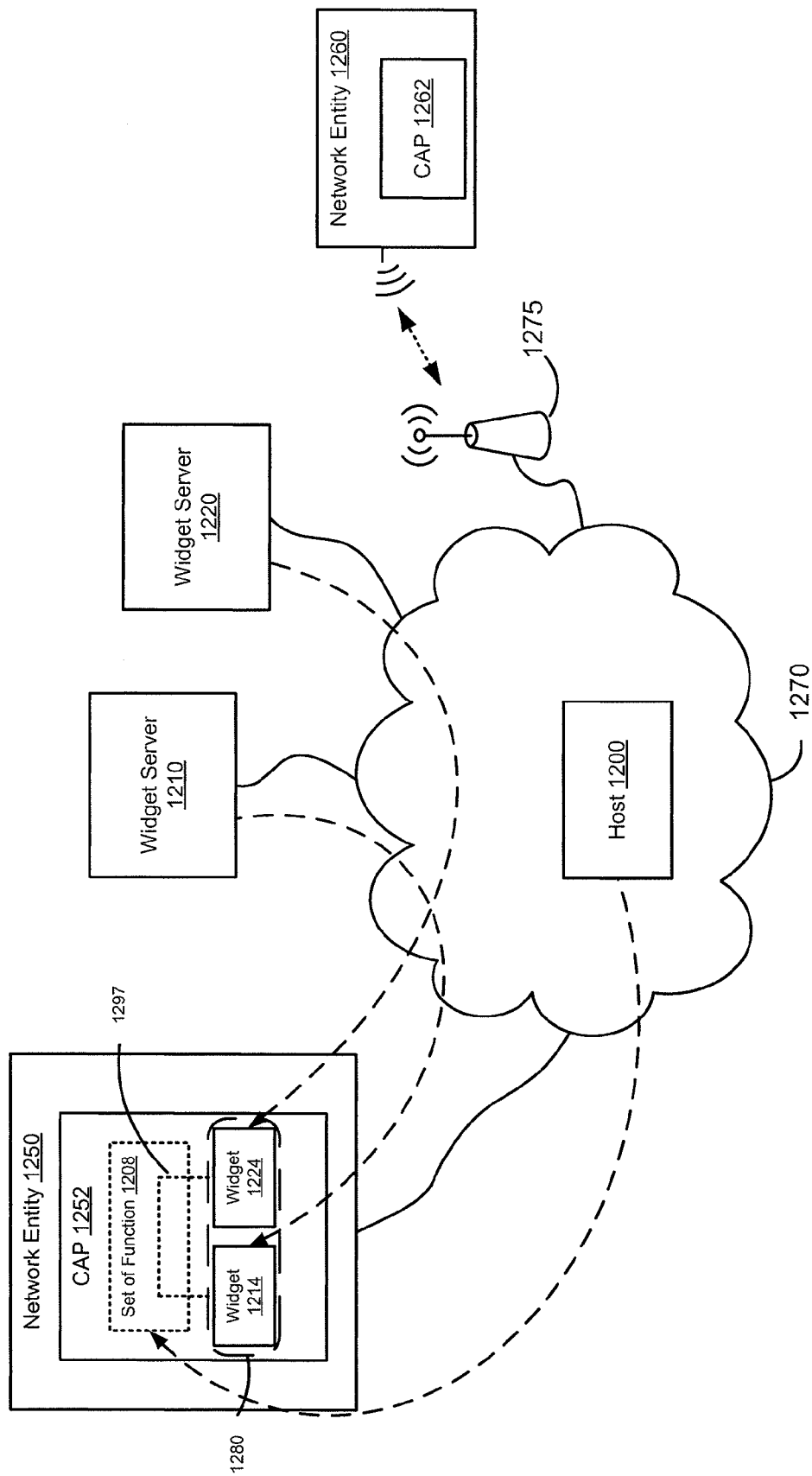
FIG. 12 is a schematic block diagram that illustrates widgets configured to communicate with one another via a communication channel established at a content aggregation point associated with a network entity, according to an embodiment.

FIG. 12 is a schematic block diagram that illustrates widgets 1280 configured to communicate with one another via a communication channel 1297 established at a content aggregation point 1252 associated with a network entity 1250, according to an embodiment. The widgets 1280 include widget 1214, which is served to content aggregation point 1252 from widget server 1210, and widget 1224, which is served to content aggregation point 1252 from widget server 1220. A set of functions 1208 is served to the content aggregation point 1252 from a host 1200 (e.g., a widget sharing host) within network 1270. Specifically, the set of functions 1208 is served to the network entity 1250 so that the set of functions 1208 can be used (e.g., controlled, accessed) by various applications at the network entity 1250 such as content aggregation point 1252. In some embodiments, the set of functions 1208 can be referred to as a library of functions. In some embodiments, one or more portions of the set of functions 1208 can be referred to as a kernel.

In this embodiment, the set of functions 1208 includes multiple functions related to inter-widget communication. Specifically, the set of functions 1208 includes one or more functions used by the content aggregation point 1252, as well as the widgets 1280, to establish the communication channel 1297. These functions can be referred to as communication channel functions. The set of functions 1208 can also include one or more functions that can be used by the widgets 1280 to communicate via the communication channel 1297. For example, the set of functions 1208 can include one or more functions related to inter-widget signaling. These functions can be referred to as inter-widget signaling functions.

In some embodiments, the set of functions 1208 can include various functions (such as service module functions) that can be invoked by the network entity 1250, the content aggregation point 1252, widget 1214 and/or widget 1224. For example, the set of functions 1208 can include a metadata searching/retrieval function, a polling/categorizing function, a deployment function (e.g., using a placement service module), a transaction service function (e.g., a service module for facilitating a web purchase, a service module used for signing a user up for a web service, etc.), a security function (e.g., security firewall function), a tracking function, a referral service function (e.g., a function used to refer a viewer to a widget), an advertisement function, and/or a directory function (e.g., a function used for searching in a directory).

In this embodiment, the set of functions 1208 is served to content aggregation point 1252 in response to widget 1214 and/or widget 1224 being served to the content aggregation point 1252. For example, widget 1214 can be configured to trigger loading of the set of functions 1208 when execution of at least a portion of widget 1214 has commenced. In some embodiments, for example, one or more portions of the set of functions 1208 can be requested by the content aggregation point 1252 in response to at least a portion of widget 1214 being executed at the content aggregation point 1252. In some embodiments, a portion of the set of functions 1208 can be served to content aggregation point 1252 in response to a user-triggered interaction with one of the widgets 1280, the network entity 1250, and/or the content aggregation point 1252.

In some embodiments, access to one or more functions from the set of functions 1208 can be restricted. For example, the set of functions 1208 can be configured so that only widget 1214 can access a portion of the set of functions 1208 and widgets 1224 can access a different portion of the set of functions 1208. In some embodiments, a different set of functions (not shown) can be served to the network entity 1250 for use specifically by widget 1214 and/or widget 1224. In some embodiments, one or more portions of the set of functions 1208 can be invoked (e.g., accessed), for example, via an API associated with the portion(s).

Figure 13:
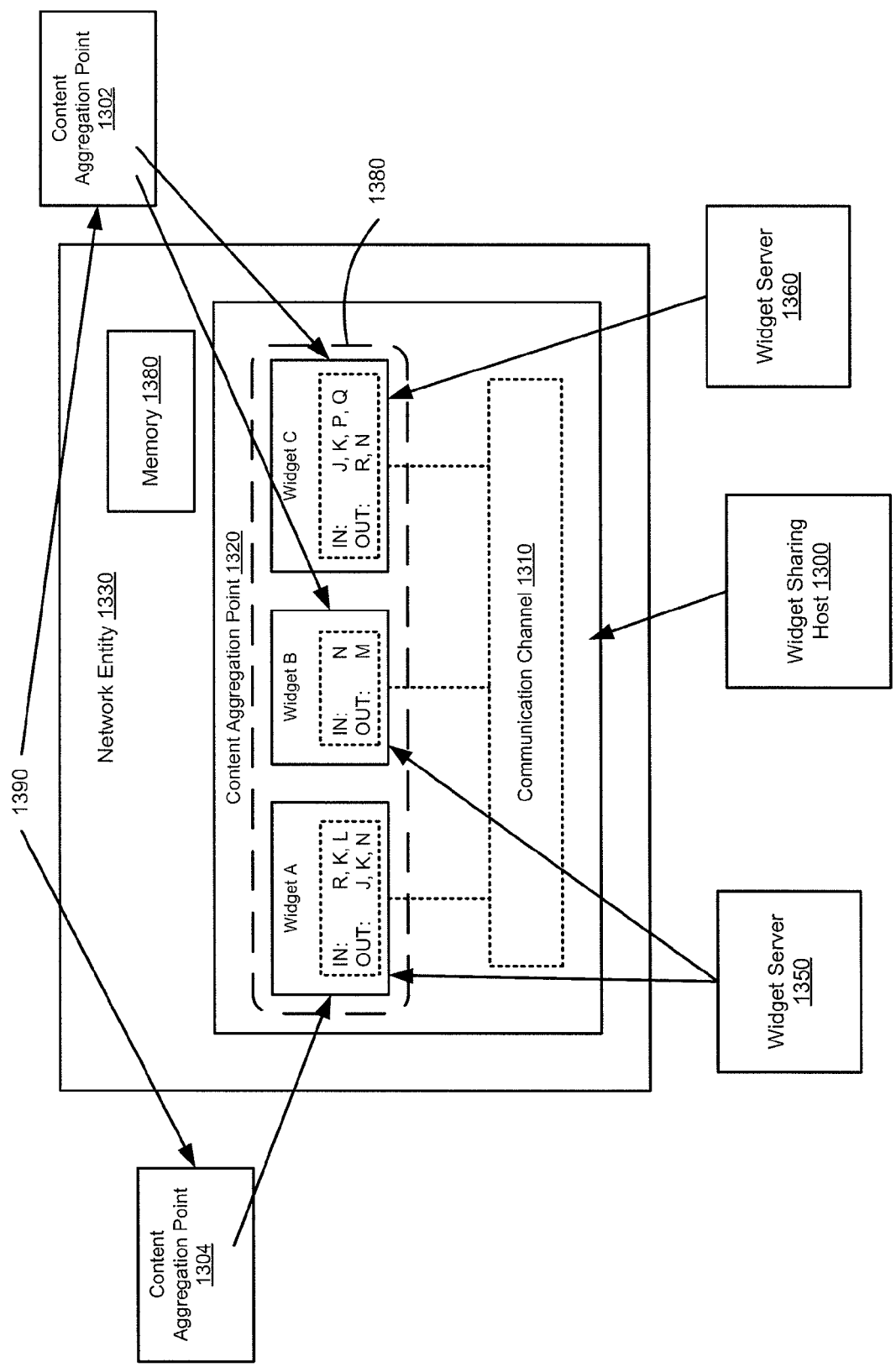
FIG. 13 is a schematic diagram that illustrates widgets configured to engage in inter-widget communication via a communication channel established at a content aggregation point associated with a network entity, according to an embodiment.

FIG. 13 is a schematic diagram that illustrates widgets 1380 configured to engage in inter-widget communication via a communication channel 1310 established at content aggregation point 1320 associated with a network entity 1330, according to an embodiment. At least a portion of widget A, widget B, and widget C (which can be collectively referred to as widgets 1380) are executing within content aggregation point 1320. Widget C is served for execution within content aggregation point 1320 from widget server 1360. Specifically, an instance of widget C can be served from widget server 1360 for execution within content aggregation point 1320 in response to a reference (not shown) to widget C being accessed at content aggregation point 1320. In some embodiments, the reference can be automatically accessed when a portion of content aggregation point 1320 is executed and/or accessed in response to a user-triggered interaction with the reference. Likewise, widget A and widget B are served for execution within content aggregation point 1320 from widget server 1350.

As indicated in FIG. 13, widget A has been shared (e.g., virally shared) from content aggregation point 1304. Specifically, a reference to widget A has been placed at content aggregation point 1320 in response to a sharing request associated with (e.g., initiated at) an instance of widget A executing at content aggregation point 1304. Likewise, widget B and widget C have been shared with content aggregation point 1320 from content aggregation point 1302.

The communication channel 1310 through which the widgets 1380 engage in inter-widget communication is established at content aggregation point 1320 associated with network entity 1330. In this embodiment, the content aggregation point 1320 is functioning as a host of the communication channel 1310. The communication channel 1310 can be established in response to a request from one or more of the widgets 1380. The communication channel 1310 can be established based on a communication channel function served to the content aggregation point 1320 and/or based on a communication channel function integrated into (e.g., programmed within) the content aggregation point 1320.

Each of the widgets 1380 is configured to receive (and/or process) specified input parameters (shown as "IN" parameters) and produce (e.g., define) specified output parameters (shown as "OUT" parameters) based on one or more functions associated with the widgets (e.g., a function programmed into the widget, a function served to the widget in response to a request from the widget, a function accessed by the widget via an API). In some embodiments, the parameters can also be referred to as information types. In this embodiment, widget A is configured to receive one or more values for input parameters R, K, and L, and is configured to produce (e.g., define) one or more values for output parameters J, K, and N. Widget B is configured to receive one or more values for input parameter N, and is configured to produce one or more values for output parameter M. Widget C is configured to receive one or more values for input parameters J, K, P, and Q, and is configured to produce one or more values for output parameters R and N. In some embodiments, a value of an output parameter can be referred to as a result and a value of an input parameter can be referred to as an operand.

As shown in FIG. 13, the widgets 1380 are each configured to produce different sets of output parameter values and are configured to receive different sets of input parameter values. In some embodiments, one or more of the widgets 1380 can be configured to receive different or the same (or similar) input parameter values and/or can be configured to produce different or the same (or similar) output parameter values. In some embodiments, one or more input/output parameter values can be translated by one or more widgets 1380 using a translation function before the input/output parameters value(s) are communicated to another of the widgets 1380.

Each of the widgets 1380 can be configured to produce (e.g., define) one or more values for the output parameters based on one or more values of the input parameters. The input parameter values and/or the output parameter values (can be referred to as input/output parameter values) can be related to any function associated with any of the widgets 1380. The input and/or output parameter values can be transmitted, via the communication channel 1310, from one widget to another widget from the widgets 1380 using inter-widget signals (e.g., inter-widget data signals). For example, widget C can be configured to receive a value for input parameter J, which is an output parameter for widget A, from widget A using an inter-widget signal over the communication channel 1310. Specifically, widget A can be configured to produce a map coordinate (which can be an output parameter value) based on a street address (which can be received as one or more of the input parameter values). In some embodiments, for example, widget A can be configured to calculate a cost estimate for purchasing a product (which can be output as an output parameter value).

In some embodiments, an input parameter value(s) and/or an output parameter value(s) can be displayed or used to produce an image on a display (not shown) associated with the network entity 1330. For example, map coordinates produced as an output parameter value by widget B can be used to produce an image of a map on a display associated with the network entity 1330. In some embodiments, an input parameter value(s) and/or an output parameter value(s) can be stored in a memory 1380 associated with the network entity 1330 and/or transmitted via a network (not shown) to, for example, a different network entity (not shown).

In some embodiments, the input parameter values and/or the output parameter values can be produced in response to a user-triggered interaction (e.g., a user input). For example, a user may transmit (e.g., trigger transmission of) values for input parameters J, K, and P to widget C, for example, via a user interface (not shown). Widget C can use one or more of these input parameter values to produce a value for output parameter N based on a function (e.g., a kernel) programmed into, or accessed by (e.g., accessed via an API by), widget C. Widget C can transmit, via the communication channel 1310, the value for output parameter N to widget B using one or more inter-widget signals. Widget B can subsequently produce a value for output parameter M based on the value for the input parameter N received from widget C.

In some embodiments, one or more input parameter value(s) and/or one or more output parameter value(s) (or tracking data derived from the parameter value(s)) can be used to cause an action. For example, an input parameter value(s) and/or an output parameter value(s) can be used to modify a behavior of a widget from the widgets 1380. For example, a value for output parameter K produced at widget A based values for input parameters R and K can be used to change an advertisement displayed at widget A or execute a particular function (e.g., an algorithm) at widget A. Specifically, widget A can trigger display of an advertisement for a red truck of a particular brand and dealer based on an output parameter value produced by widget A. The output parameter value can be produced by widget A based on a location value received at widget A as an input parameter value. The location value received by widget A can be sent, using inter-widget signaling, from widget C as an output parameter value. The output parameter value from widget C can be produced based on information collected from a user based on an interaction of the user with widget C.

In some embodiments, an input parameter value(s) and/or an output parameter value(s) can be collected and/or stored as tracking data (e.g., widget tracking data). The tracking data can be stored locally in the memory 1380 and/or at a remote location (e.g., at the channel host 1300). The tracking data can be associated with one or more of the widgets 1380, one or more of the content aggregation points 1390, the network entity 1330, a widget server (e.g., widget server 1350), the channel host 1300, and/or a user profile. In some embodiments, the tracking data can be further processed at the network entity 1330 and/or at a remote location (e.g., at the channel host 1300).

Each of the widgets 1380 can be configured to discover a function associated with another widget using inter-widget signaling. Specifically, a widget from the widgets 1380 can be configured to request (e.g., request using an inter-widget signal) information related to one or more input parameters that can be received/processed by and/or one or more output parameters produced by another widget from the widgets 1380. Based on this information the widget can send an output parameter value (as an input parameter value to the other widget) or receive an input parameter value (transmitted as an output parameter value from the other widget).

In some embodiments, in response to a widget (such as widget A) being served to content aggregation point 1320, the widget can be configured to register information (e.g., indicators) related to input/output parameter values that can be handled by the widget. The information can be stored in, for example, a portion of memory 1380 where the information can be accessed by another widget. The registered information can then be accessed and used by another widget (such as widget B) to determine whether or not certain input/output parameter values can be exchanged with the widget. In some embodiments, the registered information can be stored at a globally accessible location outside of the network entity 1330. For example, the input/output parameter values that can be handled by one or more of the widgets 1380 can be stored at the channel host 1300. In some embodiments, registration by a widget can be based on functionality available to the widget via an API. For example, a widget can indicate that it has the capability to receive specified input parameters and/or produce specified output parameters that are associated with a function that can be invoked based on an API.

In some embodiments, information related to input/output parameter values can be registered by the content aggregation point 1320 and/or the network entity 1330. In some embodiments, registration for one or more of the widgets 1380 can be triggered in response to at least a portion of the communication channel 1310 being established at content aggregation point 1320. In some embodiments, registration for one or more of the widgets 1380 can be triggered in response to the widget(s) joining the communication channel 1310. In some embodiments, registration of input/output parameter values can be a prerequisite for permission to communicate via the communication channel 1310. In some embodiments, one or more portions of the registration information can be restricted from one or more of the widgets 1380 based on widget placement (e.g., a widget placement identifier (PID)), widget type, widget content, and/or an identifier associated with the widget(s) (e.g., a widget identifier (WID)).

In some embodiments, one or more of the widgets 1380 can be configured to declare (e.g., send via a broadcast signal) input/output parameter values that can be handled by the widget(s). For example, widget A can declare (using inter-widget signaling) to widget B and widget C that widget A can handle values related to input parameters R, K, and L, and/or can declare to widget B and widget C that widget A can produce values related to output parameters J, K, and N. In some embodiments, widget A can send information related to a portion of input parameters and/or a portion of output parameters to less than all of the widgets 1380 (e.g., only widget C).

In some embodiments, after a presence of a first widget from the widgets 1380 has been determined by a second widget from the widgets 1380 based on inter-widget signaling, the second widget can specifically query the first widget with respect to one or more input/output parameter values (e.g., a specific input parameter value). For example, widget A can determine that widget B exists and is available for inter-widget communication via inter-widget signaling. After determining the presence of widget B, widget A can query whether widget B can receive one or more specified input parameter values (as output parameter values from widget A) and/or can produce one or more specified output parameter values (as input parameter values for widget A). This type of exchange can be conducted based on a inter-widget signaling protocol. In other words, one of the widgets 1380 can request information related to handling of input/output parameter values by another widget from the widgets 1380.

In some embodiments, a widget (e.g., widget B) from the widgets 1380 can be configured to, in response to an event, request, register, and/or transmit (e.g., declare) an indicator of (e.g., broadcast an indicator of) input/output parameter value(s) that can be handled. For example, one or more widgets 1380 can be configured to broadcast an indicator of and/or re-register input/output values that can be handled by the widget(s) in response to receipt of a new function served from, for example, the channel host 1300 and/or a widget server (e.g., widget server 1360). For example, one or more functions (not shown) served to a widget in response to a request can trigger re-registration based on new functionality acquired by the widget through the function(s). In some embodiments, the event can be a user-triggered event such as a user request or a user input.

In some embodiments, one or more of the widgets 1380 can be configured to regularly (e.g., periodically) and/or randomly, request, register and/or transmit (e.g., declare) indicators related to functionality. For example, one or more widgets 1380 can be configured to broadcast whether or not they can receive one or more values related to an input parameter value and/or produce one or more values related to an output parameter value according to a periodic cycle (e.g., every second). In some embodiments, one or more widgets 1380 can be configured to request information related to one or more values that can be received and/or produced by a widget from the widgets 1380 according to a schedule.

In some embodiments, the widgets 1380 can be configured to exchange input/output parameter values despite being configured to operate based on different protocols, platforms, and so forth. For example, widget A can be a java-based widget and widget B can be programmed based on a proprietary platform that is not compatible with java. However, widget A can be configured to compatibly exchange input/output parameter values with widget B by formatting the input/output parameter values based on a common protocol. The common protocol can be, for example, a inter-widget signaling protocol. In some embodiments, the widgets 1380 can be configured to access a translation function so that they can compatibly interact as described in connection with FIG. 11.

Although FIG. 13 is related to inter-widget communication via communication channel 1310, which is a communication channel established within content aggregation point 1320, the embodiments described in connection with FIG. 13 can be applied within inter-widget communication via a different communication channel configuration. For example, the embodiments described in connection with FIG. 13 can be applied in connection with a communication channel established between multiple content aggregation points (which could be executing at one or more network entities) using one or more channel hosts (e.g., network entities). The network entities may be configured to operate based on different platforms (e.g., a personal computer platform vs. a PDA platform). Also, the concepts described in connection with the embodiments of FIG. 13 can be applied to many different types of parameters (e.g., formatting parameters, parameters related to physical placement within a content aggregation point, parameters related to the attributes of the communication channel, etc.).

Figure 14:
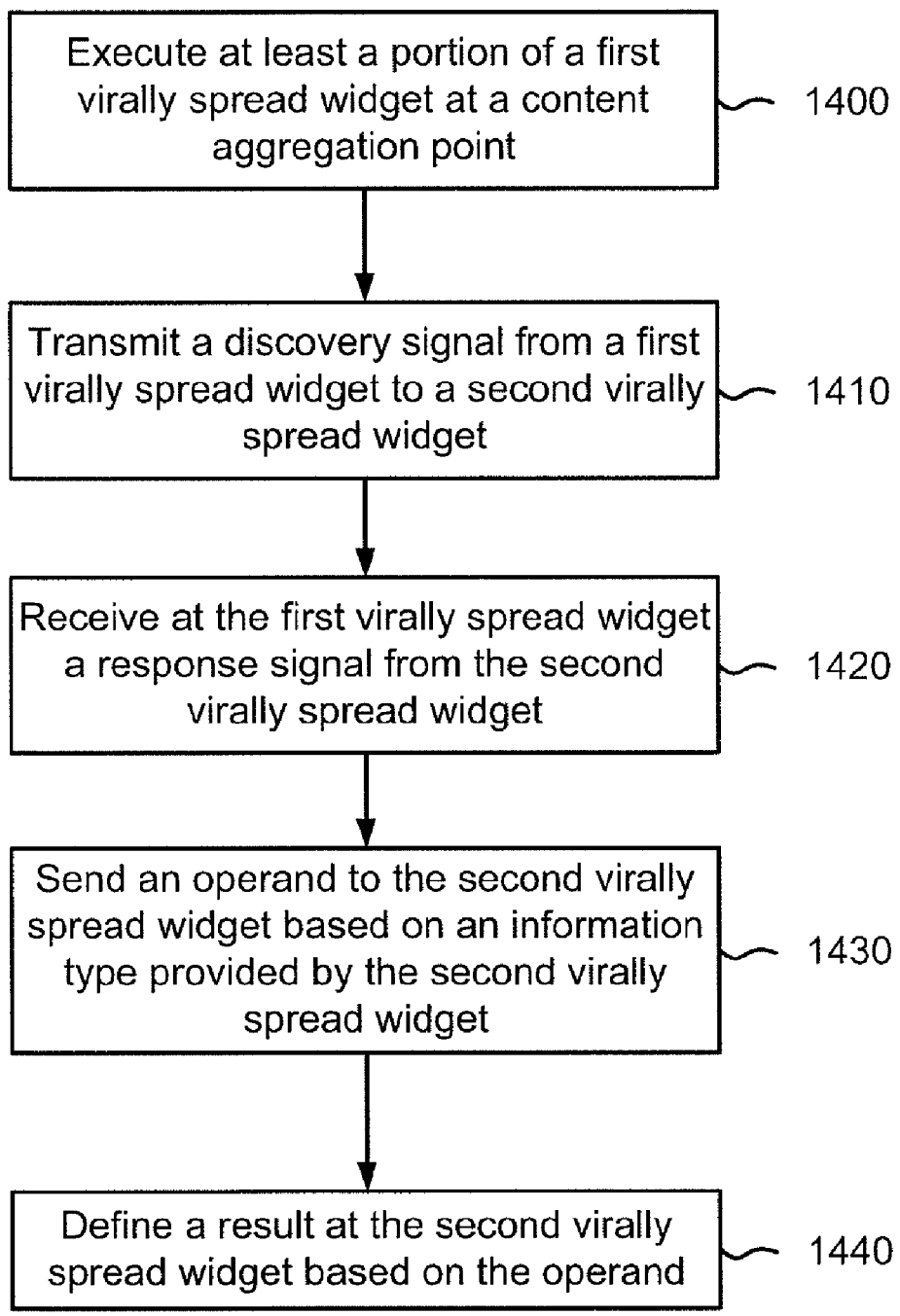
FIG. 14 is a flowchart that illustrates a method related to inter-widget signaling, according to an embodiment.

FIG. 14 is a flowchart that illustrates a method related to inter-widget signaling, according to an embodiment. As shown in FIG. 14, at least a portion of a first virally spread widget is executed at a content aggregation point. The virally spread widget can be executed in response to a reference to the widget being accessed at the content aggregation point. The widget can be shared with the content aggregation point from a different content aggregation point where an instance of the widget has been placed.

A discovery signal is transmitted from a first virally spread widget to a second virally spread widget at 1410. The second virally spread widget can be associated with a different content aggregation point than the content aggregation point associated with the first virally spread widget. The first virally spread widget and the second virally spread widget can be executing at the same or different network entities. The discovery signal can be transmitted over a communication channel after at least a portion of the second virally spread widget has been executed. In some embodiments, the discovery signal can also be sent to a third virally spread widget. In some embodiments, the discovery signal can broadcast to several virally spread widgets listening to inter-widget signals transmitted over a communication channel.

A response signal from the second virally spread widget is received at the first virally spread widget at 1420. The response signal can be transmitted via a communication channel established in response to a request from the first virally spread widget and/or the second virally spread widget. In some embodiments, the response signal can be broadcast to several virally spread widgets listening to inter-widget signals transmitted over a communication channel.

An operand is sent to the second virally spread widget based on an information type provided by the second virally spread widget at 1430. In some embodiments, the operand can also be sent from the first virally spread widget to a third virally spread widget. In some embodiments, the operand can be broadcast to several virally spread widgets listening to inter-widget signals transmitted over a communication channel.

A result is defined at the second virally spread widget based on the operand at 1440. In some embodiments, the result can be used to produce an image on a display associated with a network entity. In some embodiments, the result can be broadcast back to and used by the first virally spread, for example, to produce an image or calculate another result (e.g., a different result).

In one embodiment, a processor-readable medium storing code representing instructions to cause a processor to perform a process includes code to transmit using a communication channel a discovery signal from a first virally spread widget that has at least a portion executed at a content aggregation point to a second virally spread widget. The code also includes code to receive at the first virally spread widget a response signal sent from the second virally spread widget in response to the discovery signal.

In some embodiments, at least a portion of the second virally spread widget can be executing at the content aggregation point. In some embodiments, the content aggregation point can be a first content aggregation point associated with a first network entity and at least a portion of the second virally spread widget is executing at a second content aggregation point associated with second network entity. In some embodiments, the response signal can include an indicator of an information type provided by the second virally spread widget.

In some embodiments, the code includes code configured to transmit an operand from the first virally spread widget to the second virally spread widget. The operand can be defined based on an indicator of an information type provided by the second virally spread widget. The information type can be communicated using the response signal. The code can also include code to receive at the first virally spread widget a result from the second virally spread widget. The result can be defined at the second virally spread widget based on the operand.

In some embodiments, the transmitting can be performed in response to a reference to the first virally spread widget being accessed at the content aggregation point. The reference to the first virally spread widget can be associated with the content aggregation point in response to a placement request. In some embodiments, at least a portion of the code can be sent to the processor-readable medium from a widget host in response to the portion of the first widget being executed at the content aggregation point.

In some embodiments, the discovery signal can be a broadcast signal. In some embodiments, the discovery signal and the response signal can be defined based on a protocol associated with an application programming interface. In some embodiments, the transmitting can be performed after at least a portion of the second widget is executed at the content aggregation point.

In another embodiment, a method can include receiving an indicator that at least a portion of a first virally spread widget has been requested by a network entity for execution within a content aggregation point at the network entity. A set of functions can be sent to the network entity in response to the indicator. The set of functions can include a function configured to facilitate an interactive session between the first virally spread widget and a second virally spread widget requested for execution.

In some embodiments, the method can also include establishing a communication channel between the first virally spread widget and the second virally spread widget. At least one of the first virally spread widget or the second virally spread widget can be configured to send a discovery signal via the communication channel.

In some embodiments, the second virally spread widget can be requested by the network entity for execution within the content aggregation point. In some embodiments, the method can also include sending a signal to designate the first virally spread widget as a client-side master widget at the content aggregation point.

In some embodiments, the content aggregation point can be a first content aggregation point. The set of functions can include a sharing function configured to enable placement of the first virally spread widget at a second content aggregation point.

Some embodiments described herein relate to a computer storage product with a computer-readable medium (also can be referred to as a processor-readable medium) having instructions or computer code thereon for performing various computer-implemented operations. The media and computer code (also can be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), and Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

The embodiments described herein are related to an apparatus and methods for controlling processing of and/or distribution of static, media, and/or software objects. Those skilled in the art can readily recognize that numerous variations and substitutions may be made to achieve substantially the same results as achieved by the embodiments described herein. Many variations, modifications and alternative constructions fall within the scope and spirit of the disclosed invention as expressed in the claims. In other words, while various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A method, comprising:
   receiving a request from a processing device to send a widget to a handheld mobile device, the request being defined after at least a portion of a first instance of the widget has been processed at the processing device, the request being associated with a widget identifier;
   defining a first widget precursor at a widget-sharing server in response to the request from the processing device, the first widget precursor including the widget identifier and a placement identifier, the placement identifier being associated with placement of the widget at the handheld mobile device;
   sending, from the widget-sharing server, the first widget precursor to the handheld mobile device;
   receiving, at the widget-sharing server, a response to the first widget precursor from the handheld mobile device, the response including an indicator associated with at least one of a processing capability of a component at the handheld mobile device, a user preference, or metadata;
   defining, at the widget-sharing server and based on the response, a second widget precursor including a reference to the widget, the reference is configured such that a second instance of the widget is sent to the handheld mobile device in response to the reference being accessed at the handheld mobile device, the first instance of the widget having a different format than the second instance of the widget; and
   sending the second widget precursor from the widget-sharing server, to the handheld mobile device.

2. The method of claim 1, wherein the reference to the widget is a reference to the second instance of the widget, the second widget precursor being a placement request including a the reference to the second instance of the widget, the widget identifier, and the placement identifier.

3. The method of claim 1, wherein
   the first widget precursor is defined based on a protocol associated with the handheld mobile device, the response being
   a placement response.

4. The method of claim 1, wherein the reference to the widget is a reference to the second instance of the widget, the first instance of the widget and the second instance of the widget being associated with the widget identifier.

5. The method of claim 1, wherein the processing device is a first processing device, the placement identifier is a first placement identifier,
the method further comprising:
receiving a request from the handheld mobile device to place the widget at a second processing device after at least a portion of the second instance of the widget has executed at the handheld mobile device, the request being associated with the widget identifier and a second placement identifier different from the first placement identifier.

6. The method of claim 1, wherein the defining includes defining based on information representing a geographic location of the handheld mobile device.

7. A method, comprising:
receiving, at a widget-sharing server and from a first device, a request to place a first widget at a second device after at least a portion of an instance of the first widget has been received at the first device, the first widget being from a set of widgets, the request including a widget identifier associated with the set of widgets;
defining, at the widget-sharing server and based on the request, a first widget precursor including the widget identifier and a placement identifier, the placement identifier being associated with placement of the first widget at the second device
sending, from the widget-sharing server, the first widget precursor to the second device;
receiving, at the widget-sharing server and in response to the first widget precursor, an indicator associated with a processing capability of a component at the second device; and
defining, at the widget-sharing server and based on the indicator and the widget identifier, a signal configured to trigger sending of a second widget precursor associated with a reference to a second widget, the second widget being from the set of widgets.

8. The method of claim 7, wherein the component is an application at the second device.

9. The method of claim 7, wherein the first widget has a format different than a format of the second widget.

10. The method of claim 7, further comprising:
defining the placement identifier in response to the request.

11. The method of claim 7, wherein the second widget precursor is a mobile content vehicle.

12. The method of claim 7, further comprising:
sending an instance of a widget container to the first device, the widget container being a procedural software framework containing the first widget, the first widget being at least one of a static data object, a media object, or a software object, the request to place the first widget is defined using a share module associated with the widget container.

13. The method of claim 7, further comprising:
sending an instance of a widget container to the first device in response to a reference to the widget container being accessed from a content aggregation point, the widget container being a procedural software framework containing the first widget, the request to place the first widget being defined using a share module associated with the widget container.

14. A method, comprising:
receiving, at a widget-sharing host, from a first processing device a first request to send a widget to a second processing device, the first request being defined by the widget based on an application programming interface (API) associated with the widget-sharing host, the first request including a widget identifier associated with the widget;
defining, at the widget-sharing host and based on the first request, a first widget precursor including the widget identifier and a placement identifier, the placement identifier being associated with placement of the widget at the second processing device;
sending, from the widget-sharing host, the first widget precursor to the second processing device;
receiving, at the widget-sharing host and in response to the first widget precursor, an indication associated with the second processing device; and
defining, at the widget-sharing host and based on the indication, a signal configured to trigger sending a second widget precursor including the widget identifier to the second processing device, an instance of the widget being configured to be served to the second processing device from an entity separate from the widget-sharing host in response to a second request from the second processing device.

15. The method of claim 14, further comprising:
receiving from the first processing device a tracking indicator defined by the widget based on the application programming interface.

16. The method of claim 14, the method further comprising;
defining the placement identifier in response to the first request; and
sending the second widget precursor to the second processing device in response to the signal.

17. The method of claim 14,
the method further comprising:
sending the second widget precursor to the second processing device in response to the signal, the second widget precursor including a reference to the instance of the widget.

18. A non-transitory computer-readable medium comprising code representing instructions to cause a processor to:
receive, at a widget-sharing server, a sharing signal in response to at least a portion of a virally spread widget being processed;
define, at the widget-sharing server and based on the sharing signal, a first widget precursor including a widget identifier associated with the virally spread widget;
send the first widget precursor to a handheld mobile device that is a target of the sharing signal;
receive, at the widget-sharing server and in response to the first widget precursor, information representing a geographic location of the handheld mobile device;
define a second widget precursor at the widget-sharing server based on the geographic location of the handheld mobile device such that the second widget precursor can be used at the handheld mobile device to request an instance of the widget that has at least one of content or a service module associated with the geographic location; and
send the second widget precursor to the handheld mobile device.

19. The non-transitory computer-readable medium of claim 18, wherein the sharing signal includes a widget identifier associated with the virally spread widget, the code to cause the processor to define includes code to cause the processor to define the second widget precursor based on the widget identifier.

* * * * *

UNITED STATES PATENT AND TRADEMARK OFFICE
CERTIFICATE OF CORRECTION

PATENT NO. : 8,209,378 B2  
APPLICATION NO. : 12/244606  
DATED : June 26, 2012  
INVENTOR(S) : Stewart O. Allen et al.

Page 1 of 1

It is certified that error appears in the above-identified patent and that said Letters Patent is hereby corrected as shown below:

Column 37, line 16, after "defining" insert --the first widget precursor--;

line 17, after "defining" insert --the first widget precursor--; and

Column 38, line 57, after "the" insert --virally spread--.

Signed and Sealed this

Twenty-eighth Day of August, 2012

David J. Kappos
*Director of the United States Patent and Trademark Office*